US010322958B2

United States Patent
Sugawara et al.

(10) Patent No.: US 10,322,958 B2
(45) Date of Patent: Jun. 18, 2019

(54) SLUDGE DEWATERING SYSTEM

(71) Applicant: Metawater Co., Ltd., Tokyo (JP)

(72) Inventors: Yoshiyuki Sugawara, Tokyo (JP);
Tadashi Kunitani, Tokyo (JP);
Yoshitaka Hashimoto, Tokyo (JP)

(73) Assignee: Metawater Co., Ltd., Chiyoda-Ku (JP)

( * ) Notice: Subject to any disclaimer, the term of this patent is extended or adjusted under 35 U.S.C. 154(b) by 319 days.

(21) Appl. No.: 14/721,173

(22) Filed: May 26, 2015

(65) Prior Publication Data
US 2015/0251940 A1    Sep. 10, 2015

Related U.S. Application Data

(63) Continuation of application No. PCT/JP2013/082082, filed on Nov. 28, 2013.

(30) Foreign Application Priority Data

Nov. 29, 2012 (JP) .................................. 2012-261442

(51) Int. Cl.
*C02F 11/123* (2019.01)
*B01D 33/58* (2006.01)
(Continued)

(52) U.S. Cl.
CPC .......... *C02F 11/123* (2013.01); *B01D 33/042* (2013.01); *B01D 33/466* (2013.01);
(Continued)

(58) Field of Classification Search
CPC ........ C02F 11/123; C02F 1/008; C02F 11/14; C02F 2209/09; C02F 2303/06;
(Continued)

(56) References Cited

U.S. PATENT DOCUMENTS 4,105,558 A * 8/1978 Heinrich ................ B01D 21/01
                                                     210/199
4,341,628 A * 7/1982 Fujinami .............. B01D 33/042
                                                     210/101
(Continued)

FOREIGN PATENT DOCUMENTS

FR      2281320 A1 * 3/1976 ............. B01D 21/01
GB      2 117 659 A       10/1983
(Continued)

OTHER PUBLICATIONS

European Search Report, European Application No. 13858152.5, dated Jun. 10, 2016 (7 pages).
(Continued)

*Primary Examiner* — Krishnan S Menon
*Assistant Examiner* — Waqaas Ali
(74) *Attorney, Agent, or Firm* — Burr & Brown, PLLC

(57) ABSTRACT

A sludge dewatering system includes: a concentration apparatus that concentrates sludge while conveying the sludge on a top surface of a filter body; and a dewatering apparatus that subjects the sludge discharged from the concentration apparatus to pressure dewatering. The concentration apparatus includes: a filtering unit that subjects the sludge, which has been added with a first chemical agent, to gravity filtration; a chemical feeder that adds a second chemical agent to the sludge conveyed in the filtering unit; and a moving mechanism that moves the sludge, which has been added with the second chemical agent, in a direction intersecting a conveyance direction of the filter body.

21 Claims, 28 Drawing Sheets

(51) Int. Cl.
*C02F 11/14* (2019.01)
*B01D 33/04* (2006.01)
*B01D 33/46* (2006.01)
*B01D 33/64* (2006.01)
*C02F 1/00* (2006.01)

(52) U.S. Cl.
CPC ........... *B01D 33/58* (2013.01); *B01D 33/646* (2013.01); *C02F 1/008* (2013.01); *C02F 11/14* (2013.01); *B01D 2201/085* (2013.01); *C02F 2209/01* (2013.01); *C02F 2209/09* (2013.01); *C02F 2303/06* (2013.01)

(58) Field of Classification Search
CPC . C02F 2209/01; B01D 33/646; B01D 33/042; B01D 33/466; B01D 33/58; B01D 2201/085
See application file for complete search history.

(56) References Cited

U.S. PATENT DOCUMENTS

| | | | |
|---|---|---|---|
| 5,207,907 A | | 5/1993 | DeLons et al. |
| 5,857,406 A | * | 1/1999 | Scheucher ............... B30B 9/12 100/112 |
| 2009/0000752 A1 | * | 1/2009 | Dykstra .................. C02F 11/14 162/175 |
| 2009/0065448 A1 | * | 3/2009 | Schedler ............... C02F 11/125 210/770 |
| 2011/0089122 A1 | * | 4/2011 | Smith .................... B01D 33/04 210/774 |
| 2014/0367320 A1 | | 12/2014 | Sugawara |

FOREIGN PATENT DOCUMENTS

| | | | | |
|---|---|---|---|---|
| JP | 48-015364 A1 | | 2/1973 | |
| JP | 48-66164 U | | 8/1973 | |
| JP | 56-80895 U | | 6/1981 | |
| JP | 58-125398 A1 | | 7/1983 | |
| JP | 59-1096 A1 | | 1/1984 | |
| JP | 5973096 B1 | * | 5/1984 | |
| JP | 60-148698 A1 | | 8/1985 | |
| JP | S60151696 | * | 10/1985 | |
| JP | 60221200 A | * | 11/1985 | ........... B01D 33/042 |
| JP | 61-139799 U | | 8/1986 | |
| JP | S6213296 A | * | 1/1987 | |
| JP | 62-025095 U | | 2/1987 | |
| JP | 63-080998 A1 | | 4/1988 | |
| JP | 06-234099 A1 | | 8/1994 | |
| JP | 07-068300 A1 | | 3/1995 | |
| JP | 9019607 A | * | 1/1997 | |
| JP | 10180015 A | * | 7/1998 | |
| JP | 2003-126826 A1 | | 5/2003 | |
| JP | 2005-131522 A1 | | 5/2005 | |
| JP | 2009101355 A | * | 5/2009 | |
| JP | 2013-180262 A1 | | 9/2013 | |

OTHER PUBLICATIONS

Japanese Office Action (Application No. 2014-549900) dated Apr. 12, 2016 (with English translation).
International Search Report and Written Opinion (Application No. PCT/JP2013/082082) dated Dec. 24, 2013.

* cited by examiner

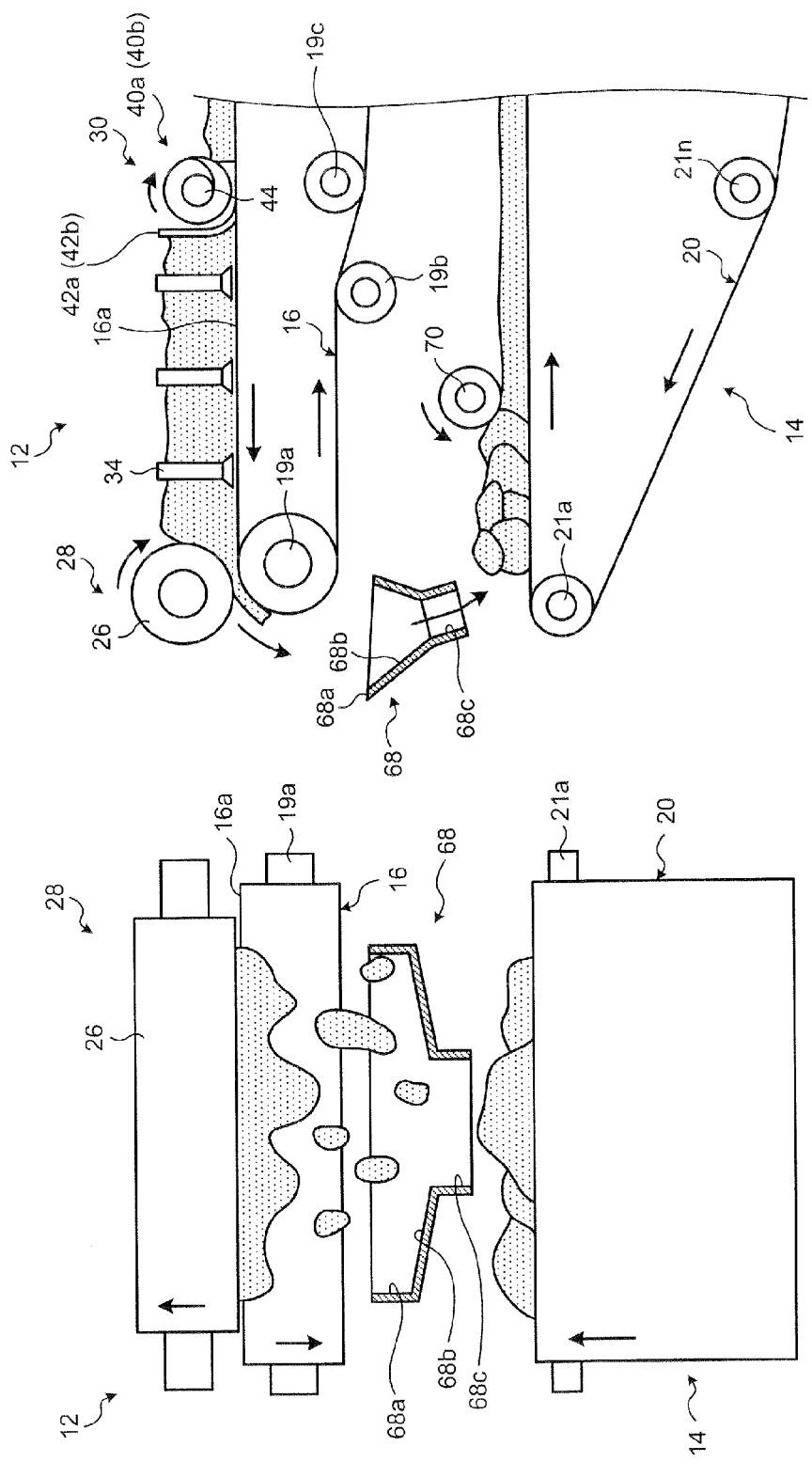

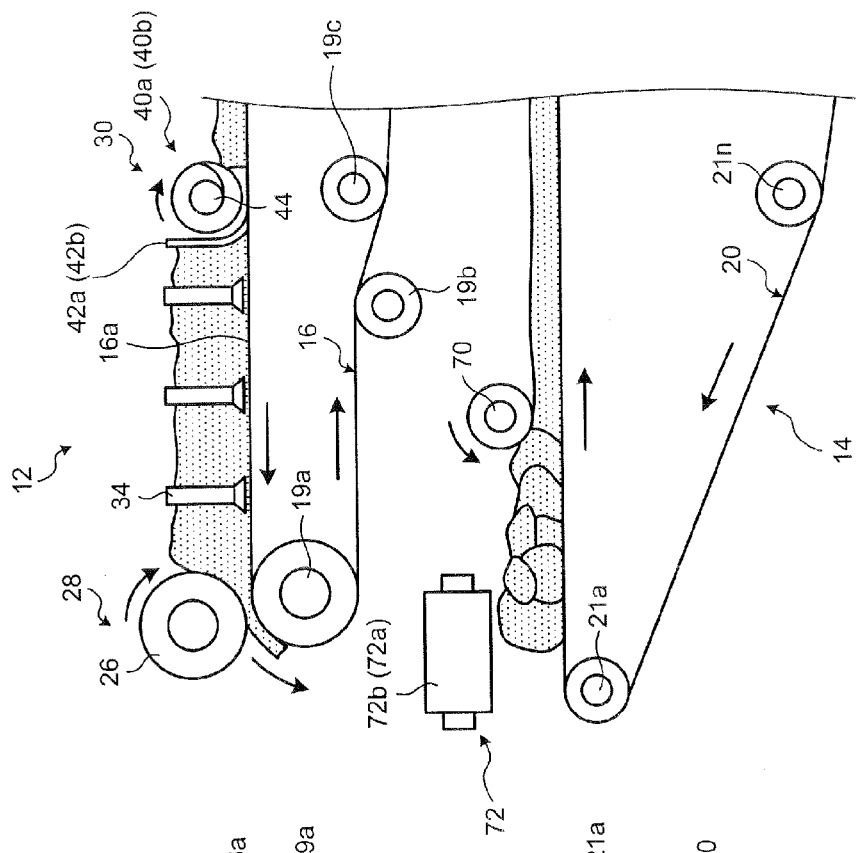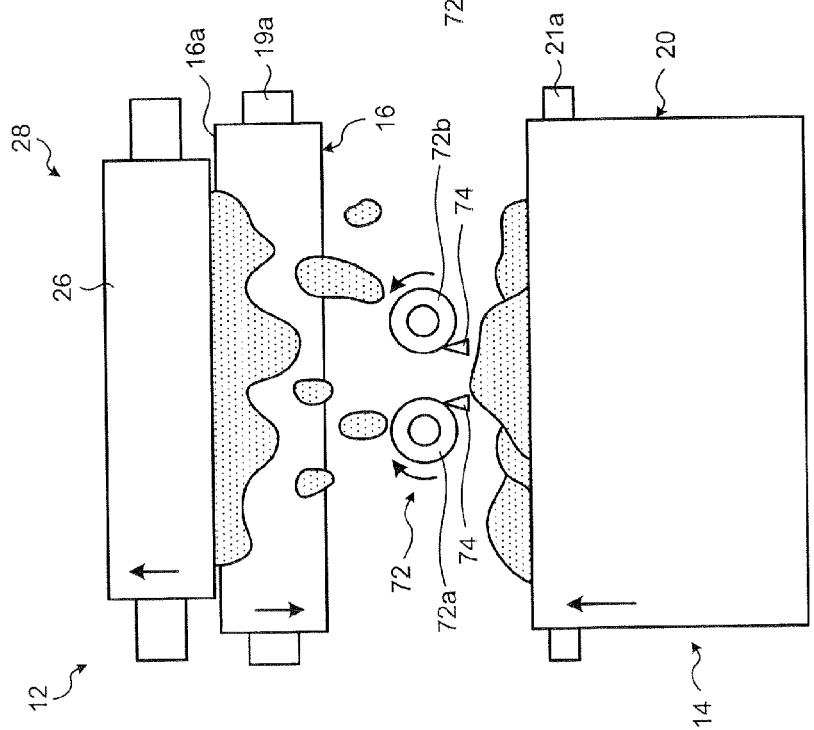

SLUDGE DEWATERING SYSTEM

CROSS-REFERENCE TO RELATED APPLICATION

This application is a continuation of PCT International Application No. PCT/JP2013/082082 filed on Nov. 28, 2013 which claims the benefit of priority from Japanese Patent Application No. 2012-261442 filed on Nov. 29, 2012, the entire contents of which are incorporated herein by reference.

BACKGROUND OF THE INVENTION

1. Field of the Invention

The present invention relates to a sludge dewatering system that includes a concentration apparatus, which concentrates sludge while conveying the sludge on a top surface of a filter body, and a dewatering apparatus, which subjects the sludge concentrated by the concentration apparatus to pressure dewatering.

2. Description of the Related Art

A sludge dewatering system has been conventionally used, which includes: a concentration apparatus that subjects sludge in sewage, industrial wastewater, or the like to gravity filtration while conveying the sludge on a top surface of a circularly moving endless belt shaped filter body (filter cloth); and a dewatering apparatus that is arranged downstream from this concentration apparatus and subjects the sludge concentrated by the concentration apparatus to pressure dewatering, with a belt press type dehydrator or the like.

For example, in Japanese Utility Model Application Publication No. 62-25095 (hereinafter to be referred to as Patent Literature 1), a system is disclosed, in which, below a concentration apparatus that subjects sludge to gravity filtration with an endless belt shaped filter body, a belt press type dewatering apparatus that subjects the sludge concentrated by this concentration apparatus to pressure dewatering is arranged, and which is formed of a configuration in which one of belts forming the dewatering apparatus is used also as the filter body of the gravity apparatus. In this system, by addition of a first flocculant, such as a cationic polymer, to the sludge just before the gravity apparatus and addition of a second flocculant, such as an anionic polymer, to the sludge just before the dewatering apparatus, dewatering ratio of the sludge is increased.

SUMMARY OF THE INVENTION

It is an object of the present invention to at least partially solve the problems in the conventional technology.

A sludge dewatering system according to the present invention includes: a concentration apparatus that concentrates sludge while conveying the sludge on a top surface of a filter body; and a dewatering apparatus that subjects the sludge discharged from the concentration apparatus to pressure dewatering. The concentration apparatus includes: a filtering unit that subjects the sludge, which has been added with a first chemical agent, to gravity filtration; a chemical feeder that adds a second chemical agent to the sludge conveyed in the filtering unit; and a moving mechanism that moves the sludge, which has been added with the second chemical agent, in a direction intersecting a conveyance direction of the filter body.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8A is a front view of a structure for feeding sludge to a dewatering apparatus from a concentration apparatus according to a first modified example;

FIG. 8B is a side view of a structure for feeding sludge to a dewatering apparatus from a concentration apparatus according to a first modified example;

FIG. 9A is a front view of a structure for feeding sludge to a dewatering apparatus from a concentration apparatus according to a second modified example;

FIG. 9B is a side view of a structure for feeding sludge to a dewatering apparatus from a concentration apparatus according to a second modified example;

FIG. 21B is a cross section diagram along a XXIE-XXIE line in FIG. 19;

DETAILED DESCRIPTION OF THE PREFERRED EMBODIMENTS

Hereinafter, preferred embodiments of a sludge dewatering system according to the present invention will be described in detail with reference to the accompanying drawings.

In the system described in Patent Literature 1, the second flocculant is added at a conveyance terminal end portion of the gravity apparatus and the second flocculant is mixed into the sludge by utilizing falling of the sludge into the dewatering apparatus from the gravity apparatus. However, just by simply letting the sludge added with the second flocculant freely fall, it is difficult to sufficiently mix the flocculant into the sludge, and it is difficult to widely improve sludge dewatering efficiency within the system as a whole and to increase the resulting concentration of the sludge.

In contrast, according to the embodiment described below, it is possible to provide a sludge dewatering system that is able to efficiently concentrate and dehydrate sludge and increase a resulting concentration thereof.

Figure 1:
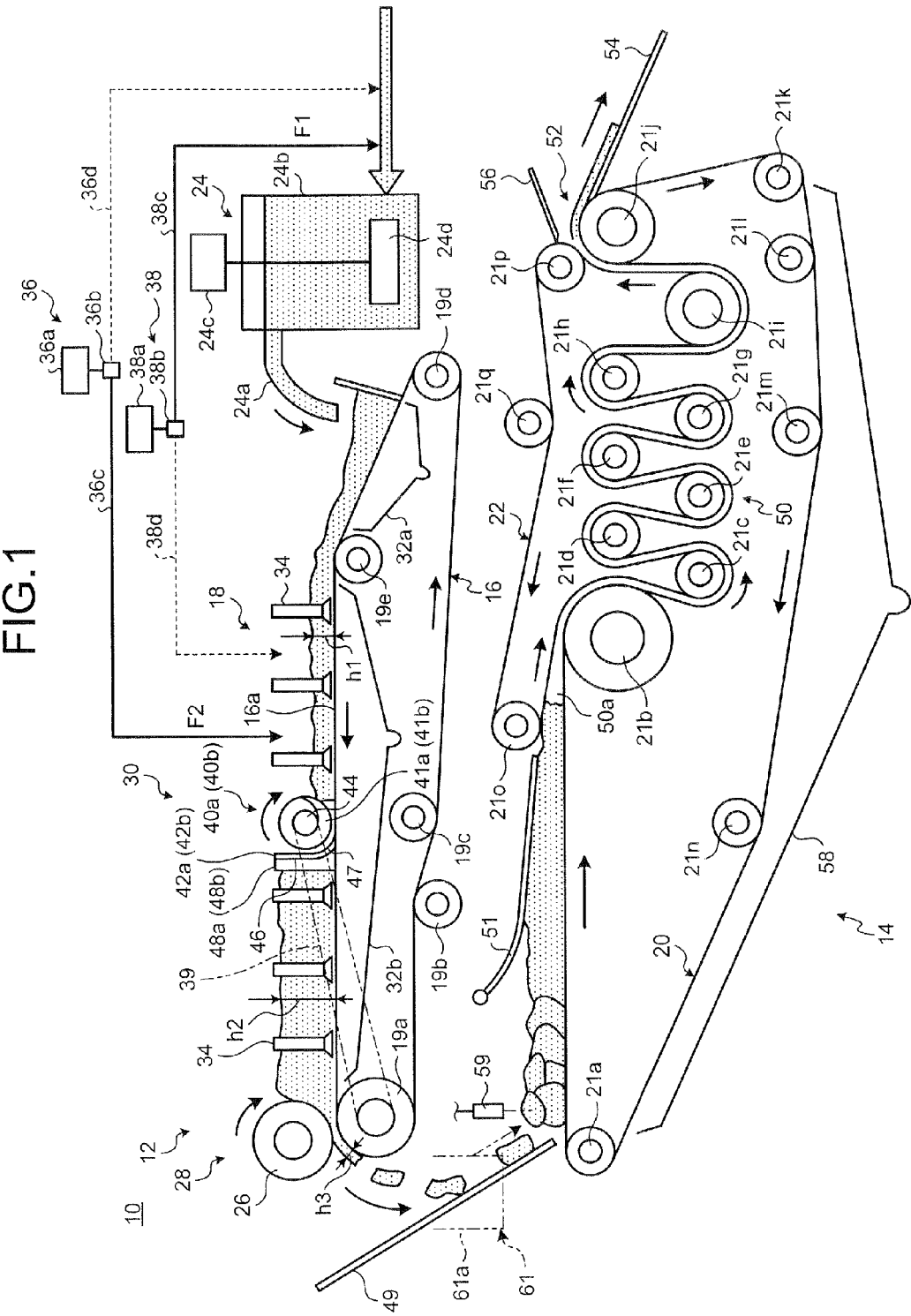
FIG. 1 is a side view illustrating an overall configuration of a sludge dewatering system according to an embodiment of the present invention.
Figure 2:
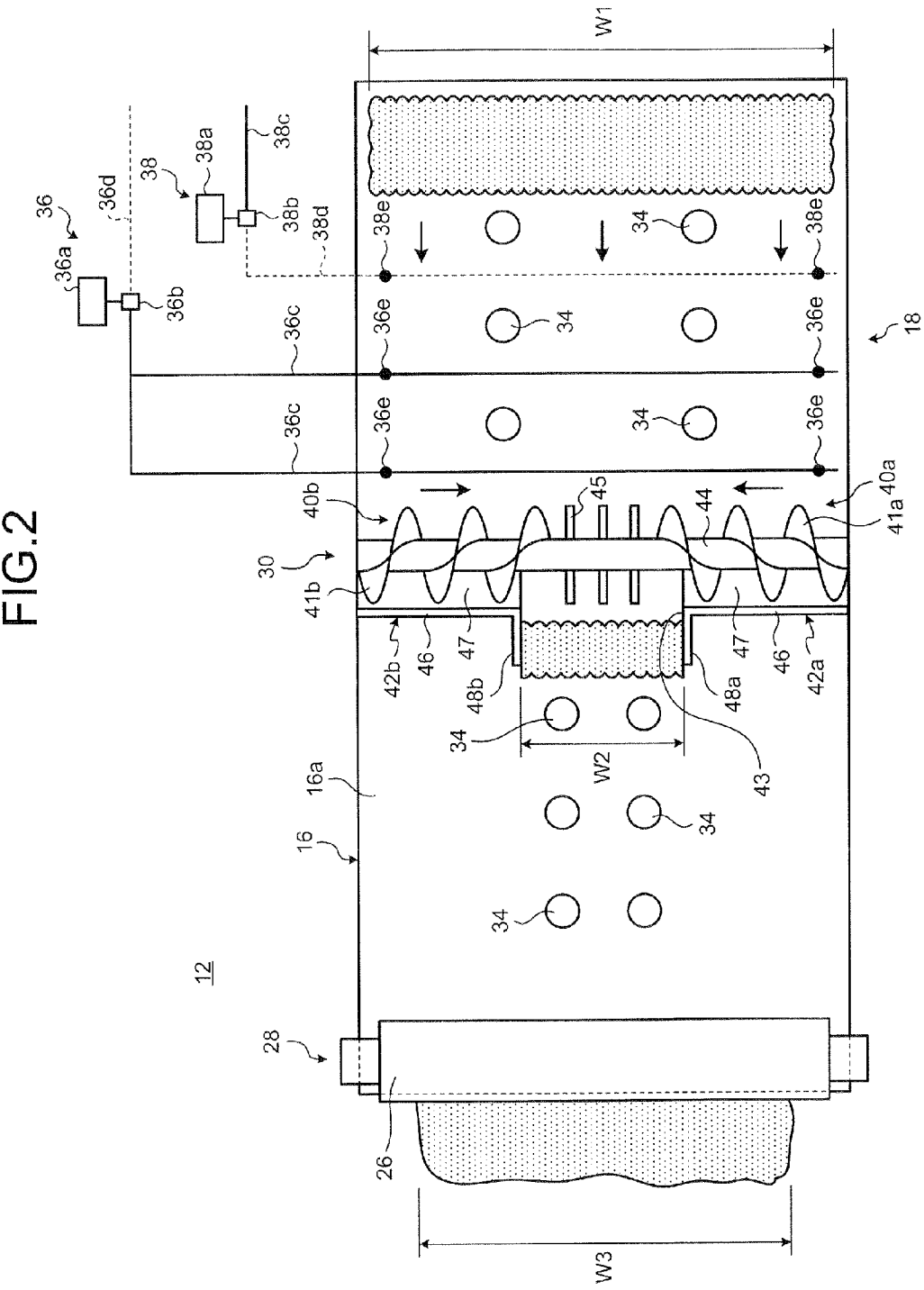
FIG. 2 is a plan view of a concentration apparatus forming the sludge dewatering system shown in FIG. 1.

FIG. 1 is a side view illustrating an overall configuration of a sludge dewatering system 10 according to an embodiment of the present invention, and FIG. 2 is a plan view of a concentration apparatus 12 forming the sludge dewatering system 10 shown in FIG. 1. The sludge dewatering system 10 according to this embodiment is a sludge treatment facility that discharges, after subjecting sludge (for example, sewage sludge) to gravity filtration in the concentration apparatus 12 of an upper stage, the sludge as dehydrated cake by subjecting the sludge to pressure dewatering in a dewatering apparatus 14 of a lower stage.

The sludge dewatering system 10 includes: the concentration apparatus 12, which has a filtering unit 18 that subjects the sludge to gravity filtration (gravity concentration) on a top surface 16a of a filter cloth belt (filter body) 16 traveling on an endless path; and the dewatering apparatus 14, which conveys the sludge concentrated by the concentration apparatus 12 while sandwiching the sludge between a pair of filter cloth belts (belts) 20 and 22 and subjects the sludge to pressure dewatering. Just before the concentration apparatus 12, a flocculation mixing tank 24 for mixing a polymer flocculant (first chemical agent) F1 conveyed from a facility upstream of the sludge dewatering system 10 into the sludge is provided. Any generally known polymer flocculant may be used as the polymer flocculant F1, and examples thereof include anionic polymer flocculants and cationic polymer flocculants.

First, the concentration apparatus 12 will be described.

As shown in FIG. 1 and FIG. 2, the concentration apparatus 12 includes: the filtering unit 18, which subjects the sludge fed onto the top surface 16a of the filter cloth belt 16 from the flocculation mixing tank 24 to gravity filtration; and a pressurizing unit 28, which subjects the sludge that has been subjected to the gravity filtration in the filtering unit 18, to pressure dewatering by a primary dewatering roller 26 and discharges the sludge to the dewatering apparatus 14 of the lower stage. In the middle of the filtering unit 18, a moving mechanism 30, which moves the sludge in a direction intersecting (orthogonal to, in FIG. 2) a conveyance direction of the filter cloth belt 16, is provided.

The filtering unit 18 is formed of the top surface (outer peripheral surface) 16a of the endless filter cloth belt 16, which is wound around a plurality of rollers 19a, 19b, 19c, 19d, and 19e and is driven to circle in one direction. The filtering unit 18 is a means for subjecting moisture included in the sludge to filtration separation by gravity, by the sludge being placed on the top surface 16a of the filter cloth belt 16 stretched between the rollers 19a and 19e.

The filter cloth belt 16 is formed of, for example, a long band-shaped filter cloth having water permeability, a long band-shaped metallic screen having a plurality of fine holes formed in a mesh shape, or the like. The filter cloth belt 16 is wound around each of the rollers 19a to 19e with sufficient tension. The filter cloth belt 16 is able to travel in a direction shown in FIG. 1 with arrows (anticlockwise in FIG. 1) due to a drive source, such as a motor not shown. In FIG. 1 and FIG. 2, a direction from a right side (upstream side) to a left side (downstream side) is a sludge conveyance direction in the concentration apparatus 12.

Therefore, while the sludge fed and placed onto an upstream position of the filtering unit 18 from an outlet port 24*a* of the flocculation mixing tank 24 is conveyed to a downstream side by the filter cloth belt 16, the sludge is filter-dehydrated with only the moisture therein permeating through the filter cloth belt 16 due to gravity. The filtered moisture (separated liquid or filtrate) is collected by filtrate receiving trays 32*a* and 32*b* (see FIG.

On the top surface 16*a* of the filter cloth belt 16 forming the filtering unit 18, a plurality of pole bodies 34 (in FIG. 2, a configuration with a total of twelve pole bodies 34 before and after the moving mechanism is shown) are stood up. The pole bodies 34 are obstacles for promoting draining of the sludge conveyed on the filter cloth belt 16 by coming into contact with and scattering the sludge. Positions to arrange the pole bodies 34, the number and shape of the pole bodies 34, and the like may be modified as appropriate. Some of the pole bodies 34 arranged upstream of screws 40*a* and 40*b* may be replaced with a pressurizing roller (not shown) similar to the primary dewatering roller 26. In that case, a little gap may be provided between the pressurizing roller and the filter cloth belt 16 and the pressurizing roller is simply used for draining, rather than for dewatering. There may be a plurality of the pressurizing rollers.

Upstream of the moving mechanism 30 in the filtering unit 18, a second chemical feeder (chemical feeder or chemical agent adding device) 36, which adds a ferrous inorganic flocculant (second chemical agent) F2 to the conveyed sludge, is provided. The second chemical feeder 36 includes: a chemical tank 36*a* that stores therein the inorganic flocculant F2; and a first line 36*c* and a second line 36*d* that are branched by a two-way valve 36*b* from an outlet of the chemical tank 36*a*. Any generally known inorganic flocculant may be used as the inorganic flocculant F2, and examples thereof include ferrous inorganic flocculants and aluminous inorganic flocculants.

As shown in FIG. 2, in this embodiment, the first line 36*c* is further branched into two in parallel, these two first lines 36*c* and 36*c* are extended over a width direction of the filter cloth belt 16 at an upstream position of the moving mechanism 30, and addition nozzles 36*e* are respectively provided near both side portions of the filter cloth belt 16. Of course, the first line 36*c* may be singly used as-is without being branched. As shown with a broken line in FIG. 1, the second line 36*d* is arranged to be able to add the inorganic flocculant F2 into the sludge fed into the flocculation mixing tank 24, and although illustration thereof is omitted, the second line 36*d* may have a configuration similar to that of the addition nozzles 36*e* of the first line 36*c*. In a normal operational state of this embodiment, under control by a control device not shown, the two-way valve 36*b* is controlled to be switched to a first line 36*c* side.

The above mentioned polymer flocculant F1 is added by a first chemical feeder (chemical agent adding device) 38 to the sludge just before the sludge is fed into the flocculation mixing tank 24 in the normal operational state of this embodiment. The first chemical feeder 38 includes: a chemical tank 38*a* that stores therein the polymer flocculant F1; and a first line 38*c* and a second line 38*d* that are branched by a two-way valve 38*b* from an outlet of the chemical tank 38*a*.

As shown in FIG. 1, the first line 38*c* is arranged to be able to add, at a position downstream from the second line 36*d* of the second chemical feeder 36, the polymer flocculant F1 into the sludge fed into the flocculation mixing tank 24. As shown with a broken line in FIG. 2, the second line 38*d* extends over the width direction of the filter cloth belt 16 at a position upstream of the first line 36*c* of the second chemical feeder 36 and is provided respectively with addition nozzles 38*e* near both side portions of the filter cloth belt 16. In the normal operational state of this embodiment, under control by the control device not shown, the two-way valve 38*b* is controlled to be switched to a first line 38*c* side.

Upon normal operation, the flocculation mixing tank 24, into which the sludge that has been added with the polymer flocculant F1 from the first chemical feeder 38 is introduced, includes a tank 24*b*, in which the sludge is stored, and a stirring blade 24*d* that stirs the sludge in the tank 24*b* with a motor 24*c* being a drive source. The sludge that has been sufficiently mixed with the polymer flocculant F1 in the tank 24*b* by the stirring blade 24*d* is fed onto the top surface 16*a* of the filter cloth belt 16 from the outlet port 24*a*.

Next, the moving mechanism 30 provided in the middle of this filtering unit 18 consolidates the sludge by simultaneously reducing a width direction dimension of the sludge and increasing height of the sludge while moving the sludge conveyed on the filter cloth belt 16 in a cross direction and sufficiently kneads the inorganic flocculant F2 added by the second chemical feeder 36. Thereby, sludge filtration efficiency in the concentration apparatus 12 and dewatering apparatus 14 is able to be improved and sludge concentration is able to be increased.

The moving mechanism (screw conveyor) 30 includes: a pair of screws 40*a* and 40*b*, which open towards an entire upstream surface of the top surface 16*a* of the filter cloth belt 16 to be able to receive the sludge, and move the sludge in the direction orthogonal to the conveyance direction of the filter cloth belt 16; and a pair of guide plates 42*a* and 42*b*, which are arranged close to and downstream from the screws 40*a* and 40*b* and are respectively arranged to stand up at both width direction end sides of the filter cloth belt 16. In the moving mechanism 30, a gap between the guide plates 42*a* and 42*b* (which is approximately the same as the gap between the respective screws 40*a* and 40*b*) serves as a passage (sludge passage 43) for discharging the sludge to a downstream side from the moving mechanism 30.

The screws 40*a* and 40*b* have: a screw shaft 44 extending in the direction orthogonal to the sludge conveyance direction of the filter cloth belt 16 and going over the width direction on the filter cloth belt 16; and screw blades 41*a* and 41*b* respectively provided spirally at both sides on an outer peripheral surface of the screw shaft 44 excluding the vicinity of the center thereof.

Both end portions of the screw shaft 44 are pivotally supported by bearings not shown, at width direction outer side positions, and for example, by being linked to the roller 19*a*, around which the filter cloth belt 16 has been wound, with a flexible power transmission member 39 (see a two-dot chain line in FIG. 1), such as a chain or a belt, the screw shaft 44 is able to rotate along with traveling of the filter cloth belt 16. When the traveling operation of the filter cloth belt 16 and the rotational operation of the screw shaft 44 are configured to be synchronized with each other, by designing, as appropriate, a diameter of each shaft, around which the flexible power transmission member 39 is wound, or by installing a reduction gear or the like not shown, a relation between sludge conveyance speed by the filter cloth belt 16 and rotational speed of the screw shaft 44 (that is, moving speed of sludge by the screws 40*a* and 40*b*) is able to be easily set and controlled. Of course, a drive source, such as a motor, which independently drives to rotate the screw shaft 44, may be provided.

The screw blades 41a and 41b respectively forming the screws 40a and 40b are respectively provided on the outer peripheral surface of the screw shaft 44 at positions near both width direction sides of the filter cloth belt 16 and ends of the screw blades 41a and 41b are opposite to each other via a gap that is about the same as the gap between the guide plates 42a and 42b. Spiral directions of the respective screw blades 41a and 41b are shaped in contrast (oppositely) with respect to a center line of the filter cloth belt 16 and moving directions of the sludge by the respective screws 40a and 40b are set in opposite directions. Therefore, the screws 40a and 40b respectively move the sludge inwards (towards the center) from outer sides in the width direction of the filter cloth belt 16, and at a central portion where their ends are separated via the gap, the sludge parts moved from both of these outer sides push each other to be consolidated and the inorganic flocculant F2 is sufficiently kneaded in the sludge. Each of the screws 40a and 40b may be configured by using an individual screw shaft instead of being configured by using the common screw shaft 44.

In this embodiment, at the central portion of the screw shaft 44, that is, on the outer peripheral surface of the screw shaft 44 exposed between the respective screws 40a and 40b, a plurality of paddles 45, which are for smoothly discharging the sludge conveyed in a width direction center side of the filter cloth belt 16 and the sludge consolidated to the center by the pair of screws 40a and 40b to a downstream side, are provided. The paddles 45 are an impeller provided with groups of paddles, each of the groups having a few paddles along a circumferential direction of the screw shaft 44 on the peripheral surface thereof, for example.

The guide plates 42a and 42b have: wall portions 46 that stand up at positions downstream from the screws 40a and 40b and close to the screws 40a and 40b; and bottom portions 47 that cover an approximate bottom half of the screws 40a and 40b by bottom ends of the wall portions 46 being curved and protruded to an upstream side in the sludge conveyance direction of the filter cloth belt 16. At center side end portions of the guide plates 42a and 42b, a pair of passage plates 48a and 48b, which extend to a downstream side along the sludge conveyance direction of the filter cloth belt 16, are respectively provided. The gap between the respective guide plates 42a and 42b is positioned at a front side in the sludge moving direction of the respective screws 40a and 40b, and this gap forms the sludge passage 43 for discharging the sludge to the downstream side.

The wall portion 46 is a plate shaped member set with a height that is about the same as a height of the screws 40a and 40b and the height of the wall portion 46 may be modified as appropriate. The bottom portion 47 is, as shown in FIG. 1, a plate shaped member that is formed to protrude up to a position of the approximate center of the screws 40a and 40b towards an upstream side in the conveyance direction from the lower end of the wall portion 46, and a height of the bottom portion 47 may be modified as appropriate. For the wall portions 46 and the bottom portions 47, which form the guide plates 42a and 42b, screens or the like having multiple fine holes formed therein may be used.

The passage plates 48a and 48b are respectively arranged to stand up so as to face each other with a gap interposed therebetween, the gap having a width that is the same as the gap formed between the screw blades 41a and 41b or between the guide plates 42a and 42b. The passage plates 48a and 48b are wall members that form a passage for smoothly discharging the sludge to a downstream side, the sludge having been consolidated to the vicinity of the center of the filter cloth belt 16 by the screws 40a and 40b, and a height of the passage plates 48a and 48b is set to be about the same as that of the wall portion 46. Practically, since the sludge that has been consolidated to the center by the screws 40a and 40b is conveyed to the downstream side from the sludge passage 43 formed between the pair of guide plates 42a and 42b (wall portions 46) by the traveling of the filter cloth belt 16, the passage plates 48a and 48b may be omitted, but by the provision of the passage plates 48a and 48b, the sludge that has been consolidated to the center and increased in height is able to be conveyed more smoothly to the downstream side.

The pressurizing unit 28 forms a dewatering unit (primary dewatering unit) upstream of the dewatering apparatus 14 arranged below the concentration apparatus 12 and includes the primary dewatering roller 26 having an outer peripheral surface that is pressure-contacted with the filter cloth belt 16.

The sludge which has been subjected to filter concentration in the filtering unit 18, sufficiently kneaded with the inorganic flocculant F2 in the moving mechanism 30, and increased in height by consolidation, is subjected to pressure dewatering between the primary dewatering roller 26 and the filter cloth belt 16 in the pressurizing unit 28, and is thereafter discharged and dropped from an outlet of the pressurizing unit 28 (outlet of the concentration apparatus 12) and fed into the dewatering apparatus 14 of the following step. The pressurizing unit 28 also has a function of enlarging a dewatering area of the sludge fed into the dewatering apparatus 14 and improving dewatering efficiency therein, by squashing the sludge consolidated and gathered to the center by the moving mechanism 30 and sending out the sludge to the dewatering apparatus 14 in a state where the sludge has been spread out again in the width direction of the filter cloth belt 16.

As shown in FIG. 1, between the pressurizing unit 28 and the dewatering apparatus 14 below the pressurizing unit 28, an inclined plate 49 is arranged. The inclined plate 49 is a guide for smoothly guiding the sludge discharged and dropped from the concentration apparatus 12 onto a filter cloth belt 20 at a feeding position of the dewatering apparatus 14.

Next, the dewatering apparatus 14 will be described.

As shown in FIG. 1, the dewatering apparatus 14 includes: a dewatering unit 50 that subjects the sludge fed from the outlet of the concentration apparatus 12 via the inclined plate 49 to pressure dewatering while conveying the sludge between a pair of filter cloth belts 20 and 22; and a squeezing unit 52 that pressurizes and squeezes the sludge dehydrated by the dewatering unit 50 further, and the dewatering apparatus 14 has a configuration that is approximately the same as a general belt press type dehydrator.

The lower filter cloth belt 20 is formed of, for example, a long band-shaped filter cloth having water permeability, a long band-shaped metallic screen having a plurality of fine holes formed in a mesh shape, or the like. The filter cloth belt 20 is wound around among rollers 21a, 21b, 21c, 21d, 21e, 21f, 21g, 21h, 21i, 21j, 21k, 21l, 21m, and 21n with sufficient tension and is able to travel in a direction of arrows shown in FIG. 1 (clockwise in FIG. 1) due to a drive source, such as a motor not shown.

Approximately in the same way, the upper filter cloth belt 22 is also formed of, for example, a long band-shaped filter cloth having water permeability, a long band-shaped metallic screen having a plurality of fine holes formed in a mesh shape, or the like. The filter cloth belt 22 is wound around among rollers 21*o*, 21*b*, 21*c*, 21*d*, 21*e*, 21*f*, 21*g*, 21*h*, 21*i*, 21*j*, 21*p*, and 21*q* with sufficient tension and is able to travel in a direction of arrows shown in FIG. 1 (anticlockwise in FIG. 1) due to a drive source, such as a motor not shown.

A portion where outer peripheral surfaces (surfaces) of the lower filter cloth belt 20 and upper filter cloth belt 22 are arranged to come into contact with (or to be close to) each other while meandering up and down among the rollers 21*b* to 21*i* forms the dewatering unit 50 and the sludge is sufficiently pressure dehydrated therebetween. Further, a portion where outer peripheral surfaces (surfaces) of the lower filter cloth belt 20 and upper filter cloth belt 22 are arranged to come into contact with (or to be close to) each other between the rollers 21*j* and 21*p* forms the squeezing unit 52. The sludge is further pressurized and squeezed between the rollers 21*j* and 21*p*, which are squeeze rollers, becomes dehydrated cake having a desired moisture content, and is discharged to outside.

Near an inlet of the dewatering apparatus 14, a leveling plate 51 is provided, which is for uniformizing, to a certain degree, height of the sludge dropped and fed onto the filter cloth belt 20 from the outlet of the concentration apparatus 12 and smoothly introducing the sludge into an inlet 50*a* of the dewatering unit 50 formed between the filter cloth belts 20 and 22. The leveling plate 51 is a plate member, which is arranged above a slightly downstream side of a position where the sludge is dropped onto the filter cloth belt 20 from the concentration apparatus 12 and is inclined gradually downwards toward the inlet 50*a*, and may be formed of a plate spring member biased to a direction of pressing the sludge downwards.

At an outlet of the dewatering apparatus 14, a discharge tray 54 is arranged, close to the filter cloth belt 20 traveling on an outer peripheral surface of the roller 21*j*, and in an inclined posture with a rear end thereof going downwards. The dehydrated cake is discharged while sliding on the discharge tray 54. Above the discharge tray 54, a scraper (scraping plate) 56 is arranged, close to the filter cloth belt 22 traveling on an outer peripheral surface of the roller 21*p*, and in an inclined posture with a rear end thereof going upwards. The sludge that has stayed stuck to the upper filter cloth belt 22 without being discharged to the discharge tray 54 from between the rollers 21*j* and 21*p* is scraped off by the scraper 56 and discharged to the discharge tray 54. The sludge that has stayed stuck on the lower filter cloth belt 20 is scraped off by the discharge tray 54 and directly slides down on the discharge tray 54.

In this dewatering apparatus 14, the sludge fed onto the filter cloth belt 20 from the concentration apparatus 12 is conveyed downstream in a state of being sandwiched and pressurized by being drawn in between the filter cloth belts 20 and 22 forming the dewatering unit 50 from the inlet 50*a*. During this conveyance, filter dewatering is done by only the moisture permeating through the filter cloth belt 20 due to pressure added by both of the filter cloth belts 20 and 22, and after squeezing by the squeezing unit 52 further, dehydrated cake is discharged onto the discharge tray 54. The moisture filtered by the dewatering unit 50 and squeezing unit 52 permeates and falls through the filter cloth belt 20 and is collected by a filtrate receiving tray 58.

As shown in FIG. 1, in contrast to conventionally and generally used systems, the sludge dewatering system 10 according to this embodiment is configured such that the filter cloth belt 16 of the concentration apparatus 12 and the filter cloth belts 20 and 22 of the dewatering apparatus 14 travel on independent endless paths respectively, without being shared. Thus, traveling speed of the filter cloth belt 16 of the upstream concentration apparatus 12 and traveling speed of the filter cloth belts 20 and 22 of the downstream dewatering apparatus 14 are able to be controlled easily to be different from each other. In this case, the traveling speed of the filter cloth belts 20 and 22 of the dewatering apparatus 14 is preferably set and controlled to be slower than the traveling speed of the filter cloth belt 16 of the concentration apparatus 12. That is, in the sludge dewatering system 10, since the moving mechanism 30 is installed in the concentration apparatus 12, a dewatering ratio thereof is widely increased as compared to that of a conventional concentration apparatus, and as a result, an amount of sludge (amount of cake) fed into the dewatering apparatus 14 is able to be widely reduced, and even if the traveling speed of the filter cloth belts 20 and 22 in the dewatering apparatus 14 is slowed down, all of the fed sludge is able to be dewatering treated sufficiently. By slowing down the traveling speed of the filter cloth belts 20 and 22 in the dewatering apparatus 14, a time period to pass between the filter cloth belts 20 and 22 upon that dewatering is able to be increased, and thus while making the configuration of the dewatering apparatus 14 compact, high dewatering performance is able to be achieved.

Next, operations and effects of the sludge dewatering system 10 configured as described above will be described.

First, sludge, which is a treatment target to be concentrated and dehydrated by the sludge dewatering system 10, is introduced into the flocculation mixing tank 24 in a state of having been added with the predetermined polymer flocculant F1 through the first line 38*c* of the first chemical feeder 38. The sludge introduced into the tank 24*b* of the flocculation mixing tank 24 is sufficiently stirred and mixed by the stirring blade 24*d* to be flocculated, and is fed to the upstream side of the top surface 16*a* of the filter cloth belt 16, that is, to the inlet of the concentration apparatus 12, from the outlet port 24*a*.

The sludge fed into the concentration apparatus 12 is conveyed through the filtering unit 18 by the traveling filter cloth belt 16, and is subjected to gravity filtration (gravity dewatering) while receiving the draining promoting action by the pole bodies 34 on the way. During that process, as shown in FIG. 2 and FIG. 3, while the predetermined inorganic flocculant F2 is dropped down from the addition nozzles 36*e* of the second chemical feeder 36 to the sludge conveyed at both sides of the width direction of the filter cloth belt 16, the sludge reaches the moving mechanism 30.

Figure 3:
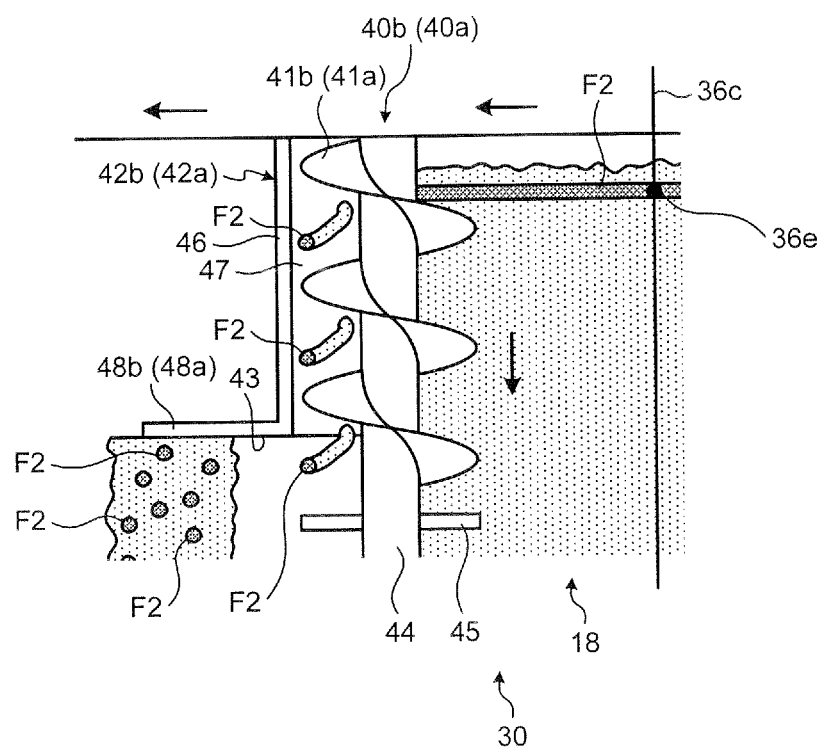
FIG. 3 is a diagram illustrating an enlarged periphery of a moving mechanism of the concentration apparatus shown in FIG. 2.

As shown in FIG. 3, in the moving mechanism 30, as the sludge, which has been conveyed on both sides in the width direction of the filter cloth belt 16 and has been added with the inorganic flocculant F2 in a band shape continuous in the conveyance direction, is rolled into rotation of the respective screws 40*a* and 40*b*, the sludge is pushed towards the central portion while being guided by the guide plates 42*a* and 42*b*. When this is done, the inorganic flocculant F2 is adhered to each small lump of the sludge moved while being cut at constant intervals by the rotating screw blades 41*a* and 41*b*.

The sludge moved by the screws 40*a* and 40*b* while accompanied by the inorganic flocculant F2 is mixed with the sludge conveyed on the central portion (center) of the filter cloth belt 16. Simultaneously, these portions of sludge are squashed onto each other at the central portion of the filter cloth belt 16 by extrusion force by the respective screws 40*a* and 40*b* to be consolidated. Thereby, the sludge passes the sludge passage 43 and is discharged downstream from between the passage plates 48*a* and 48*b* while being given with rotational force of the paddles 45 in a state where its width direction dimension has been reduced and its height (bulk) has been increased, and while this is done, gravity filtration by the filter cloth belt 16 is continued and concentration thereof up to a desired concentration is achieved. Since the filter cloth belt 16 also travels at positions before and after the screws 40a and 40b, even if a configuration without the paddles 45 is adopted, of course, the sludge consolidated by the screws 40a and 40b is able to be smoothly discharged to the downstream side from the sludge passage 43, which is an opening between the guide plates 42a and 42b.

In the process of the concentration by this concentration apparatus 12, for example, as shown in FIG. 1 and FIG. 2, by the time the sludge, which has been fed by being spread over a width W1 in the width direction of the filter cloth belt 16 with a height h1 at an inlet side of the filtering unit 18, is discharged from the moving mechanism 30, the width of the sludge is reduced to a width W2 narrower than the width W1, and thus the sludge is increased in its height direction dimension by a decrease in its planar viewed surface area to have a height h2 and is in a state of being sufficiently consolidated. Therefore, the resulting concentration of the sludge is widely increased as compared to a case where the sludge receives only normal gravity filtration in a general concentration apparatus. Further, since the sludge height has been increased at the downstream side of the moving mechanism 30; by its own weight, efficiency of gravity filtration is even more improved; and what is more, the inorganic flocculant F2 has been sufficiently kneaded thereinto by the screws 40a and 40b. Therefore, concentration by gravity filtration is able to be promoted further even for sludge that has been sufficiently dehydrated and concentrated at a time point up to the moving mechanism 30. Further, when the sludge is moved to the central portion by the screws 40a and 40b, since the sludge is squeezed while moving due to the guide plates 42a and 42b and the rotational force of the screw blades 41a and 41b, further concentration of the sludge is achieved. When that is done, moisture in the sludge squeezed by the screws 40a and 40b flows from the wall portion 46 along the bottom portion 47 and is filtered by the filter cloth belt 16.

The sludge consolidated by the moving mechanism 30 is conveyed downstream further and introduced into the pressurizing unit 28 while receiving the draining promoting action by the pole bodies downstream therefrom. The sludge introduced into the pressurizing unit 28: is spread from the width W2 to a width W3 by being held and pressurized between the primary dewatering roller 26 and the filter cloth belt 16; is pressure dehydrated while its height becomes a height h3 less than the height h2 to be discharged and dropped; and slides on the inclined plate 49 to be fed into the dewatering apparatus 14. The moving mechanism 30 is able to enlarge the dewatering area of the sludge in the dewatering apparatus 14 of the following step by flatly spreading again, in the pressurizing unit 28, the sludge once consolidated in the moving mechanism 30, and to improve dewatering efficiency thereof.

The sludge that has been dropped and fed to an inlet side of the dewatering apparatus 14 is leveled by the leveling plate 51 while being conveyed by the traveling filter cloth belt 20 and is thereafter introduced first from the inlet 50a to the dewatering unit 50. In the dewatering unit 50, the sludge is conveyed while being efficiently dehydrated by being held and pressurized between the meandering pair of upper and lower filter cloth belts 20 and 22 and is next introduced into the squeezing unit 52. In the squeezing unit 52, the sludge becomes dehydrated cake having a desired moisture content by being strongly pressurized and squeezed between the rollers 21j and 21p, which are the squeeze rollers, while being held between the pair of filter cloth belts 20 and 22, and is discharged outside of the system from the discharge tray 54.

As described above, the sludge dewatering system 10 according to this embodiment includes: the concentration apparatus 12, which concentrates the sludge while conveying the sludge on the top surface 16a of the filter cloth belt 16 that is the filter body; and the dewatering apparatus 14, which subjects the sludge discharged from the concentration apparatus 12 to pressure dewatering, and the concentration apparatus 12 includes: the filtering unit 18, which subjects the sludge added with the first chemical agent (for example, the polymer flocculant F1) to gravity filtration; the second chemical feeder 36, which adds the second chemical agent (for example, the inorganic flocculant F2) to the sludge conveyed in the filtering unit 18; and the moving mechanism 30, which moves the sludge added with the second chemical agent in the direction intersecting the conveyance direction of the filter cloth belt 16.

Therefore, with the sludge dewatering system 10, in the concentration apparatus 12, by moving the sludge in the direction intersecting with the conveyance direction of the filter cloth belt 16 by the moving mechanism 30 after the second chemical agent is added to the sludge that has been concentrated to a certain degree by the first chemical agent being added therein and the sludge being gravity filtered by the filtering unit 18, the sludge is able to be sufficiently kneaded with the second chemical agent upon this movement and is able to be consolidated further. In particular, even if the ferrous inorganic flocculant F2, for which an appropriate amount to be added in the sludge is set to be small, is used, that small amount of the inorganic flocculant F2 is able to be easily and sufficiently mixed into the sludge. Thereby, concentration and dewatering ratio of the sludge in the concentration apparatus 12 are able to be improved and the resulting concentration is able to be increased. Moreover, by providing, in the concentration apparatus 12, the second chemical feeder 36, which adds the second chemical agent after the concentration by the addition of the first chemical agent, and the moving mechanism 30, which kneads this second chemical agent; while being able to decrease the amounts of the polymer flocculant F1 and inorganic flocculant F2 used, the moisture content of the sludge is able to be decreased widely with the compact configuration and the resulting concentration of the sludge is able to be increased further.

If the two-way valve 38b is switch controlled to use the second line 38d for the first chemical feeder 38 for the polymer flocculant F1 and the two-way valve 36b is switch controlled to use the second line 36d for the second chemical feeder 36 for the inorganic flocculant F2, the first chemical agent is the inorganic flocculant F2 and the second chemical agent is the polymer flocculant F1, and the switch-over (the switch-over of the two-way valves 36b and 38b) may be performed according to characteristics of the sludge to be treated and the like as appropriate.

In the sludge dewatering system 10, the moving mechanism 30 has the screws 40a and 40b, which extend in the direction intersecting the sludge conveyance direction of the filter cloth belt 16 and moves the sludge by their rotation; and the guide plates 42a and 42b, which guide the movement of the sludge by the screws 40a and 40b, are stood up at the positions, which are downstream from the screws 40a and 40b in the sludge conveyance direction of the filter cloth belt 16 and which are close to the screws 40a and 40b. Therefore, the sludge is able to be moved by the screws 40a and 40*b* while being dammed up by the guide plates 42*a* and 42*b*, the sludge is able to be squeezed, and the resulting concentration thereof is able to be increased further.

The guide plates 42*a* and 42*b* have the sludge passage 43, which is the opening to pass the sludge downstream, the sludge having been moved by the screws 40*a* and 40*b* forward in the direction the sludge is moved by the screws 40*a* and 40*b*, that is, towards the center of the filter cloth belt 16 from the respective screws 40*a* and 40*b* in FIG. 2. The moving mechanism 30 is configured to simultaneously reduce the width direction dimension of the sludge on the filter cloth belt 16 and knead the second chemical agent into the sludge, by moving the sludge added with the second chemical agent with the screws 40*a* and 40*b* to be discharged from the sludge passage 43 to the downstream side. Therefore, since by the moving mechanism 30, the sludge is able to be smoothly discharged from the sludge passage 43 to the downstream side by kneading the second chemical agent into the sludge while increasing the height of the sludge, while increasing the resulting concentration of the sludge even further, the moving mechanism 30 is able to be prevented from hindering smooth conveyance of the sludge on the filter cloth belt 16. Further, the guide plates 42*a* and 42*b* are able to prevent the sludge, which receives conveyance force on the filter cloth belt 16 also during the movement by the moving mechanism 30, from flowing out, without being moved by the moving mechanism 30, to the downstream side.

In the sludge dewatering system 10, the concentration apparatus 12 has the pressurizing unit 28, which is arranged downstream from the moving mechanism 30 and which discharges the sludge to the dewatering apparatus 14 after performing enlargement of the width direction dimension of the sludge simultaneously with the pressure dewatering of the sludge, which has been sent out from the sludge passage 43 with its width direction dimension being reduced by the moving mechanism 30. Thereby, the sludge added with the two chemical agents and consolidated by the moving mechanism 30 is able to be sent out to the dewatering apparatus 14 after the sludge is spread flatly again by the pressurizing unit 28, and thus the dewatering area of the sludge introduced into the dewatering apparatus 14 is enlarged and the dewatering efficiency therein is further improved.

In the sludge dewatering system 10 according to this embodiment, as shown in FIG. 1, the moisture content of the sludge fed into the dewatering apparatus 14 at the outlet side of the concentration apparatus 12 may be measured by a moisture meter (measuring device) 59, and according to a result of detection by this moisture meter 59, the traveling speed of the filter cloth belts 20 and 22 in the downstream dewatering apparatus 14 may be controlled to be changed by a control device not shown. The moisture meter 59 to be used may be of a general infrared type, and may be arranged at a position where the sludge just after its fall onto the filter cloth belt 20 from the concentration apparatus 12 is detectable.

As described above, in the sludge dewatering system 10, by setting and controlling the traveling speed of the filter cloth belts 20 and 22 of the downstream dewatering apparatus 14 to be slower than the traveling speed of the filter cloth belt 16 of the upstream concentration apparatus 12, the sludge dewatering performance in the dewatering apparatus 14 is able to be improved. Upon this control, the moisture content of the sludge concentrated by the concentration apparatus 12 may be measured with the moisture meter 59, and for example, if the moisture content is less than a reference value, a volume of the sludge (amount of cake) introduced into the dewatering apparatus 14 may be determined to be small and by making the traveling speed of the filter cloth belt 20 and 22 slower than a reference speed, the moisture content is able to be decreased further. On the contrary, if the moisture content of the sludge detected by the moisture meter 59 is higher than the reference value, the volume of the sludge introduced into the dewatering apparatus 14 may be determined to be large and by making the traveling speed of the filter cloth belts 20 and 22 faster than the reference speed, the treatable amount of the sludge in the dewatering apparatus 14 is able to be increased and failure in the treatment is able to be prevented. That is, even if the characteristics of the sludge to be treated change, dewatering treatment is able to be performed with appropriate rotational speed according to throughput of the dewatering apparatus 14.

As shown with a two-dot chain line in FIG. 1, instead of the moisture meter 59, a viscometer 61 (measuring device) may be used, which once stores the sludge dropped from the concentration apparatus 12 in a container 61*a* and measures viscosity of the sludge in this container 61*a*. If the viscometer 61 is used, as a result of its detection, for example, if the viscosity of the sludge is less than a reference value, this means approximately the same as the moisture content being low, and thus the traveling speed of the filter cloth belts 20 and 22 is made slower than a reference speed, and if the viscosity of the sludge is greater than the reference value, this means approximately the same as the moisture content being high, and thus the traveling speed of the filter cloth belts 20 and 22 is made faster than the reference speed.

Figure 5:
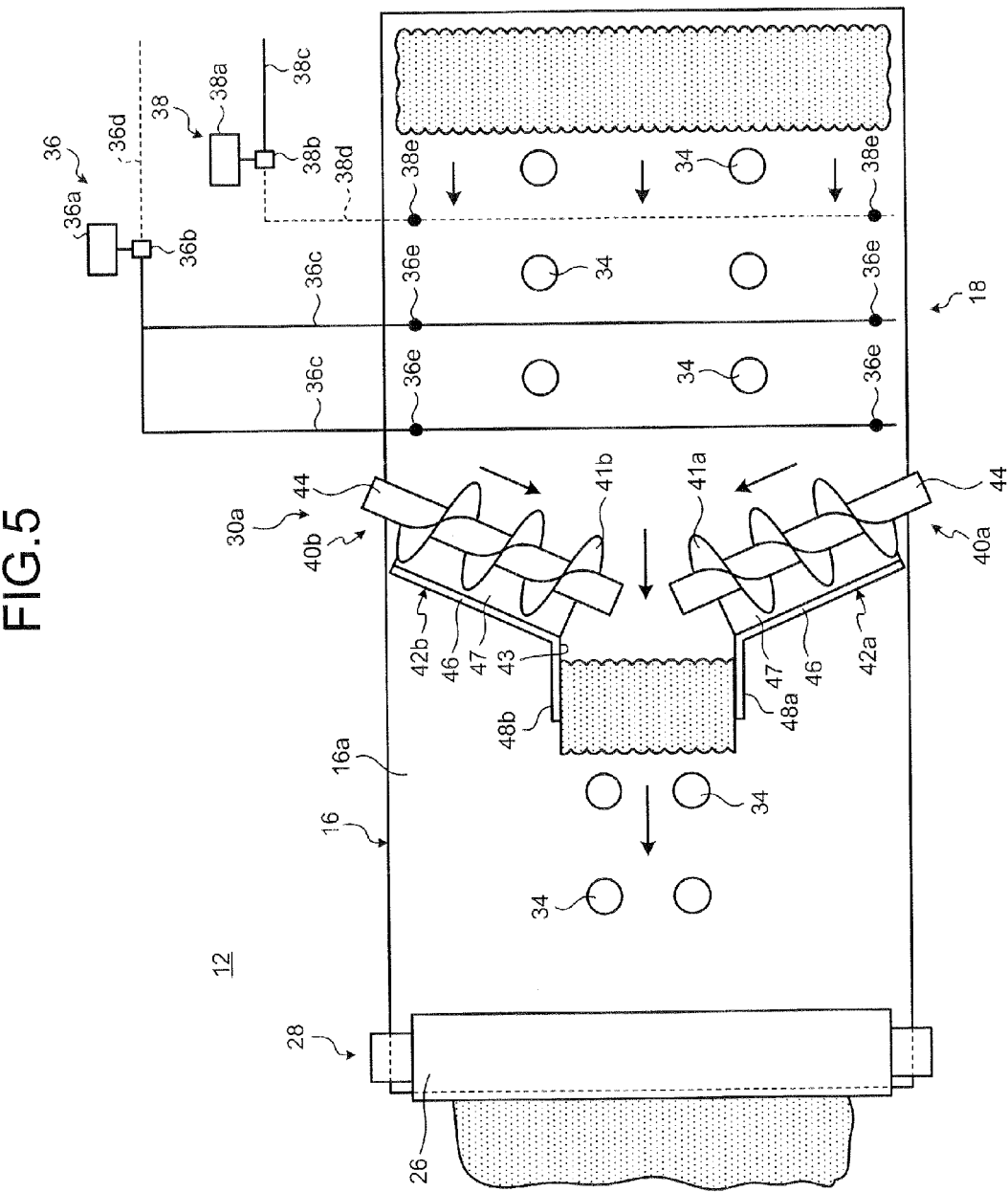
FIG. 5 is a plan view of a concentration apparatus including a moving mechanism according to a first modified example.

FIG. 5 is a plan view of the concentration apparatus 12 including a moving mechanism 30*a* according to a first modified example.

Figure 4A:
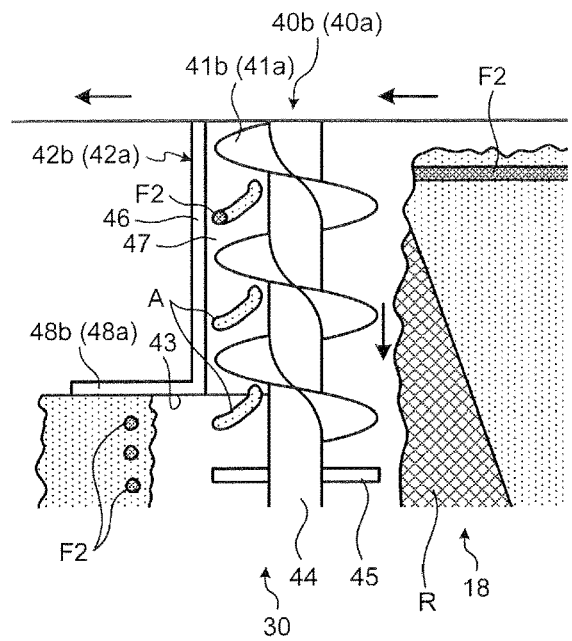
FIG. 4A is a diagram illustrating a state where a screw has been arranged in a direction orthogonal to a sludge conveyance direction.

FIG. 2 exemplifies a configuration in which the screws 40*a* and 40*b* and the guide plates 42*a* and 42*b* forming the moving mechanism 30 are arranged in a direction orthogonal to the sludge conveyance direction of the filter cloth belt 16. For this configuration example, the sludge that reaches the moving mechanism 30 first just after start operation of the sludge dewatering system 10 is, for example, as shown in FIG. 4A, in a state where a head portion thereof is spread in the width direction of the filter cloth belt 16. Thus, depending on various conditions, such as characteristics and conveyance speed of the sludge, of the sludge introduced into the moving mechanism 30, a region R shown with a triangular shape in FIG. 4A is more inner than the side portions where the inorganic flocculant F2, which is the second chemical agent, is added, and thus the region R may: be immediately rolled into and cut by the screws 40*a* and 40*b* ahead thereof without being kneaded with the inorganic flocculant F2; become small lumps A not mixed with the inorganic flocculant F2; and be directly consolidated and discharged from the sludge passage 43.

Figure 4B:
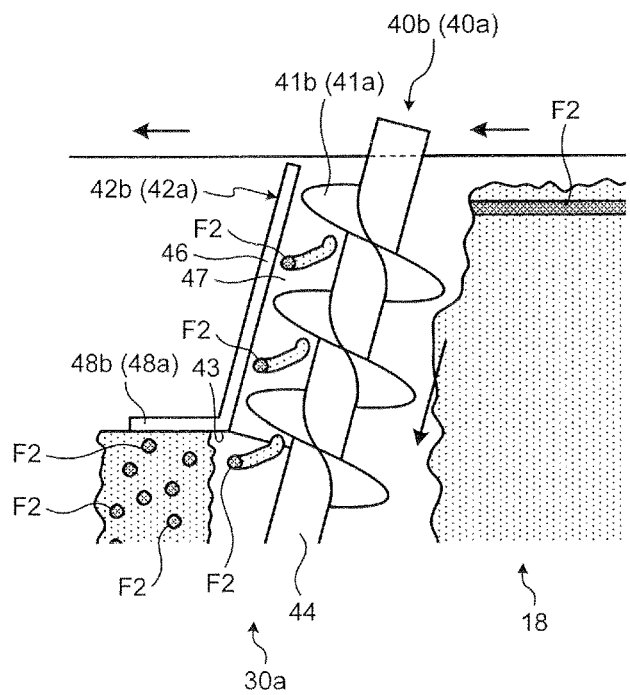
FIG. 4B is a diagram illustrating a state where a screw has been arranged in a direction tilted with respect to the sludge conveyance direction.

Accordingly, as shown in FIG. 4B and FIG. 5, the moving mechanism 30*a* may be configured with the screws 40*a* and 40*b* and the guide plates 42*a* and 42*b* being arranged in a tilted orientation with which one side end portion thereof corresponding to one side of the width direction of the sludge added with the inorganic flocculant F2 by the second chemical feeder 36 is at an upstream side with respect to the sludge conveyance direction of the filter cloth belt 16. Accordingly, even for the sludge that reaches the moving mechanism 30*a* first just after the start of the operation of the sludge dewatering system 10, as shown in FIG. 4B; of the head portion thereof, the side part thereof added with the inorganic flocculant F2 is rolled into the screws 40*a* and 40*b* first. Therefore, the inorganic flocculant F2 is able to be infallibly kneaded into the sludge moved by the screws 40*a* and 40*b*.

Figure 6:
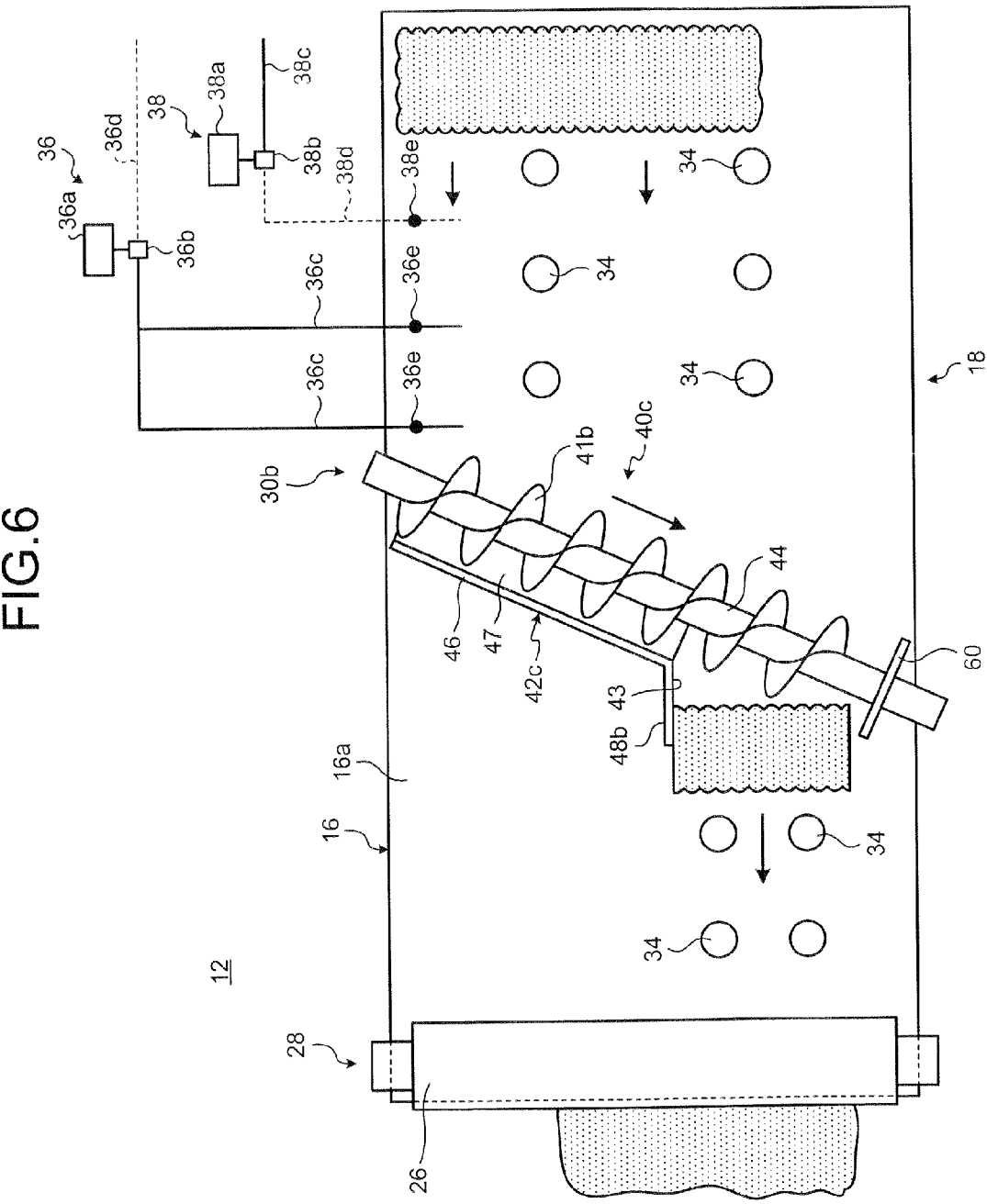
FIG. 6 is a plan view of a concentration apparatus including a moving mechanism according to a second modified example.

FIG. 6 is a plan view of the concentration apparatus 12 including a moving mechanism 30*b* according to a second modified example.

Although FIG. 5 exemplifies the moving mechanism 30*a* having the configuration in which the screws 40*a* and 40*b* are arranged in a V-shape in a plan view, as shown in FIG. 6, one screw 40*c* and a guide plate 42*c* corresponding thereto may be arranged, as the moving mechanism 30*b*, in a tilted orientation in which one side end portion thereof, which corresponds to one of sides of the width direction of the sludge where the inorganic flocculant F2 is added by the second chemical feeder 36, is on the upstream side.

In the moving mechanism 30*b*, a disk 60 is provided on an outer peripheral surface of the screw shaft 44 at a front side in the sludge moving direction of the screw 40*c*, such that the sludge moved by the screw 40*c* is smoothly discharged to the downstream side from the sludge passage 43. Therefore, the sludge moved by the screw 40*c* is consolidated while being sufficiently kneaded with the inorganic flocculant F2 and is smoothly discharged to the downstream side from the sludge passage 43 between the passage plate 48*b* and the disk 60.

Tilt angles of the screws 40*a* to 40*c* and the guide plates 42*a* to 42*c* forming the above described moving mechanisms 30*a* and 30*b* may be set according to the traveling speed of the filter cloth belt 16 or the like as appropriate, and for example, if the direction orthogonal to the sludge conveyance direction is 0°, the tilt angles are preferably set in a range of about 0° to 60°. Further, angles to set the screws 40*a* to 40*c* may be, for example, if the belt conveyance speed is determined from the amount of sludge conveyed, angles at which the sludge moving time from the end portions of the screws 40*a* to 40*c* to the central portion matches the belt moving time therebetween, that is, may be set in combination with angles of the screw blades 41*a* and 41*b*, or the like.

Figure 7:
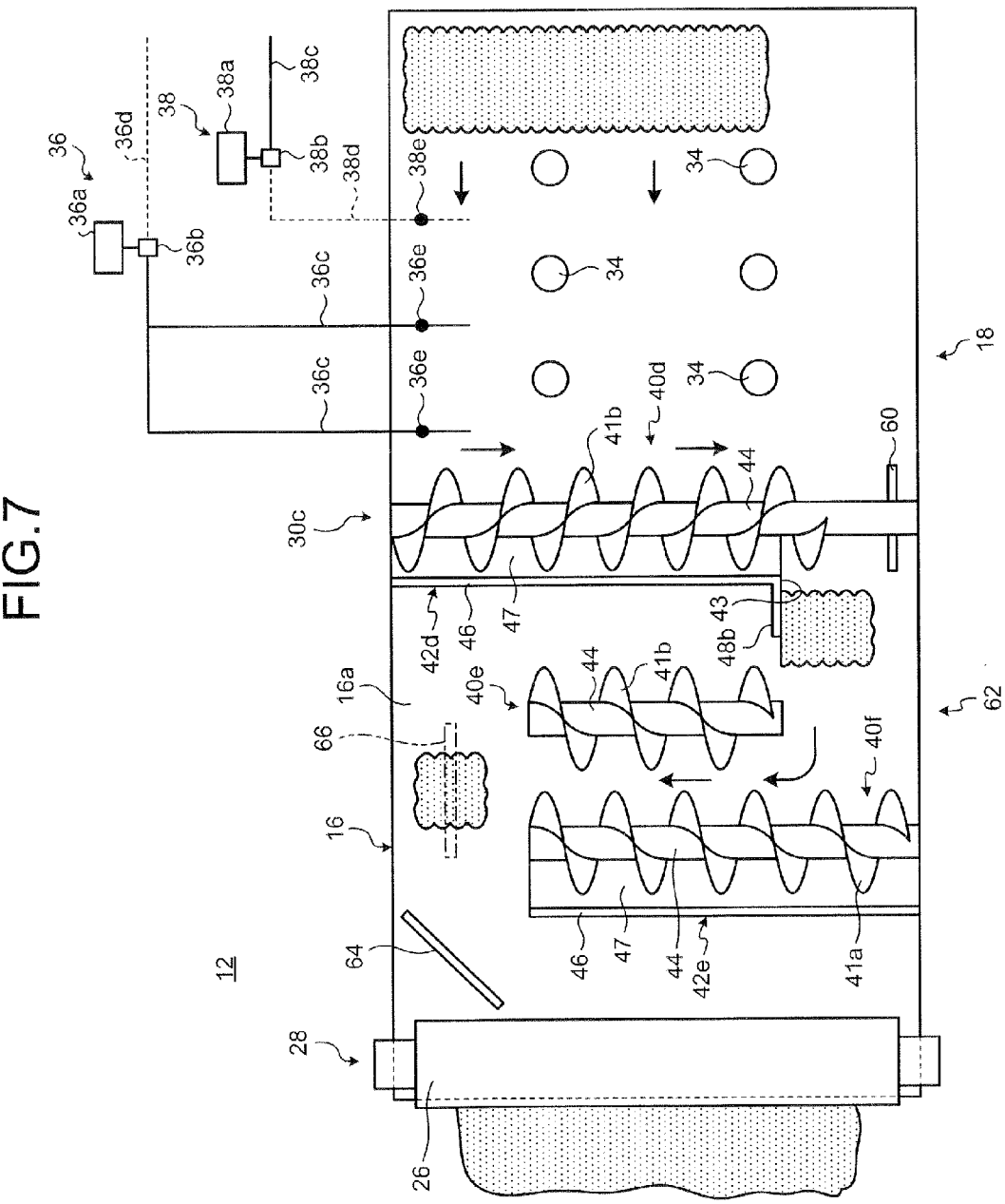
FIG. 7 is a plan view of a concentration apparatus including a moving mechanism according to a third modified example.

FIG. 7 is a plan view of the concentration apparatus 12 including a moving mechanism 30*c* according to a third modified example.

As shown in FIG. 7, the moving mechanism 30*c* includes: one screw 40*d*, which extends over the width direction of the filter cloth belt 16, similarly to the screw 40*c* of the moving mechanism 30*b* shown in FIG. 6; and a kneading mechanism 62, which is downstream from a guide plate 42*d* arranged close to and downstream from the screw 40*d*, and which is formed of a pair of screws 40*e* and 40*f* arranged in parallel with the screw 40*d*.

The screw 40*d* is set along the direction orthogonal to the sludge conveyance direction of the filter cloth belt 16, and is provided with the disk 60 on the outer peripheral surface of the screw shaft 44 at the front side in the sludge moving direction of the screw 40*d*, similarly to the screw 40*c* shown in FIG. 6, such that the moved sludge is smoothly discharged to a downstream side from the sludge passage 43. Therefore, the sludge moved by the screw 40*d* is consolidated while being sufficiently kneaded with the inorganic flocculant F2 and is smoothly discharged to the downstream side from the sludge passage 43 between the passage plate 48*b* and the disk 60. Instead of the screw 40*d*, the screw 40*c* shown in FIG. 6 may be used, of course.

The screw 40*e* is provided along the direction orthogonal to the sludge conveyance direction, formed shorter than the screw 40*d*, and one end portion thereof (lower end portion in FIG. 7) is set at a position keeping away from the sludge discharged from the sludge passage 43 of the screw 40*d*. A spiral direction of the screw 40*e* is, for example, the same as that of the screw 40*d*, but their rotational directions are opposite to each other, and the screw 40*e* is able to move the sludge in a direction (upwards in FIG. 7) opposite to that by the screw 40*d*.

The screw 40*f* is arranged close to and downstream from the screw 40*e*, provided along the direction orthogonal to the sludge conveyance direction, and formed shorter than the screw 40*d* and longer than the screw 40*e*. The screw 40*f* is able to receive the sludge, which has been discharged from the sludge passage 43 of the screw 40*d* and has passed the side of the screw 40*e*. A spiral direction of the screw 40*f* is, for example, opposite to that of the screws 40*c* and 40*d*, a rotational direction thereof is the same as that of the screw 40*c* and opposite to that of the screw 40*e*, and the screw 40*f* is able to move the sludge in a direction that is the same as that by the screw 40*e* (upwards in FIG. 7). In the vicinity of a downstream side of this screw 40*f*, approximately in the same way as the above described guide plate 42*d*, a guide plate 42*e* is arranged to stand up.

Therefore, in the kneading mechanism 62, after the sludge is consolidated and kneaded by the upstream screw 40*d*, the sludge discharged from the sludge passage 43 is able to be moved while being kneaded even further between the pair of screws 40*e* and 40*f*, and thus the inorganic flocculant F2 added to the sludge by the second chemical feeder 36 is able to be mixed therein even more uniformly.

In this kneading mechanism 62, a tilted plate 64 is arranged at an outlet side downstream position of the pair of screws 40*e* and 40*f*. The tilted plate 64 is arranged in a tilted orientation in which one side end portion thereof corresponding to one side of a width direction of the sludge conveyed by the filter cloth belt 16 is at an upstream side. By this provision of the tilted plate 64, the sludge discharged from between the pair of screws 40*e* and 40*f* and conveyed by the filter cloth belt 16 is able to be guided towards the central portion of the filter cloth belt 16 and introduced smoothly into the pressurizing unit 28.

As shown with a two-dot chain line in FIG. 7, an abutment plate 66 may be arranged, which stands up along the conveyance direction of the filter cloth belt 16 oppositely to the outlet of the pair of screws 40*e* and 40*f*. When this abutment plate 66 is arranged, the sludge moved and kneaded by the pair of screws 40*e* and 40*f* is able to be smoothly introduced into the pressurizing unit 28 while being moved sideways. If the abutment plate 66 is to be arranged, the tilted plate 64 may be omitted.

In the configuration example shown in FIG. 1, the sludge discharged from the outlet (pressurizing unit 28) of the upper stage concentration apparatus 12 slides on the inclined plate 49 while falling down and is fed into the lower stage dewatering apparatus 14, but as shown in FIG. 8, instead of the inclined plate 49, a gathering apparatus 68 may be provided, which feeds the sludge into the dewatering apparatus 14 after gathering the falling sludge discharged from the concentration apparatus 12.

As shown in FIG. 8A and FIG. 8B, the gathering apparatus 68 is, for example, a funnel shaped hopper. The gathering apparatus 68: receives, with an upper opening 68*a* thereof that is largely open, the sludge discharged in a state of being spread out from the pressurizing unit 28 of the upper stage concentration apparatus 12; lets the sludge gather while falling down in a tapered portion 68*b* thereof; and causes the sludge to be dropped and fed onto the filter cloth belt 20 of the dewatering apparatus 14 from a lower opening 68*c* thereof, which is an opening that is rather small. When that is done, since the sludge fed into the dewatering apparatus 14 from the gathering apparatus 68 has been gathered by the gathering apparatus 68 and has increased in bulk, instead of the leveling plate 51, a roller 70, which enables the sludge to be more infallibly spread out, may be provided to bring the dewatering area of the sludge introduced to the inlet 50a of the dewatering unit 50 in a state of being infallibly spread. Of course, instead of the roller 70, the leveling plate 51 may be arranged.

As described above, when the gathering apparatus 68 that gathers the falling sludge and the roller 70 are provided between the concentration apparatus 12 and dewatering apparatus 14; after once being gathered and consolidated by the gathering apparatus 68, the sludge, which is discharged from the pressurizing unit 28 of the concentration apparatus 12 in a widely spread state, is able to be spread out again by the roller 70 to be increased in the dewatering area, kneading of the inorganic flocculant F2 into the sludge is able to be more uniformized, and the dewatering performance is able to be improved.

Instead of the gathering apparatus 68 shown in FIG. 8, as shown in FIG. 9A and FIG. 9B, a gathering apparatus 72 may be used, which gathers the sludge between a pair of rollers 72a and 72b. The rollers 72a and 72b: extend along the traveling direction of the filter cloth belt 20; are arranged oppositely to each other via a predetermined interval; and as shown in FIG. 9A, by rotating reversely of each other, roll in the sludge falling from the pressurizing unit 28 and let the sludge fall downwards while letting the sludge gather. As shown in FIG. 9A, on a lower surface side of the rollers 72a and 72b, scrapers 74 for scraping off the sludge stuck on the rollers 72a and 72b may be provided.

Figure 10A:
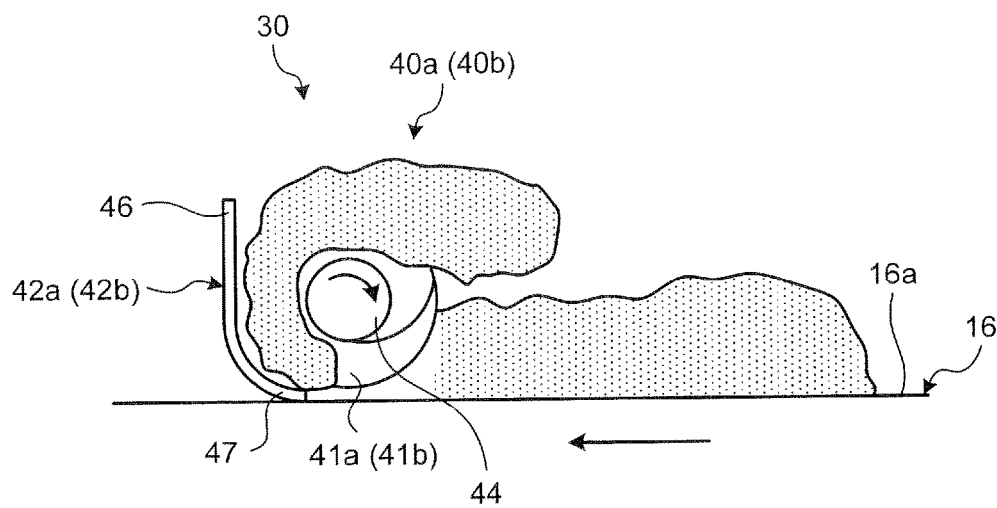
FIG. 10A is a diagram illustrating an example of a state where sludge is treated by use of the guide plate shown in FIG. 1.

The configuration example in FIG. 1 illustrates the configuration, in which, in order to stably move the sludge by the moving mechanism 30, in the vicinity of the downstream side of the screws 40a and 40b, the wall portions 46 of the guide plates 42a and 42b are stood up approximately in the vertical direction. However, in such a configuration example, in which the wall portions 46 are stood up approximately in the vertical direction, as shown in FIG. 10A, for example, if the sludge has a low moisture content and is hard, without being smoothly rolled into the screws 40a and 40b, the sludge may go along the guide plates 42a and 42b stood up vertically to tumble down to an upstream side of the screws 40a and 40b, and similar things can be said for the above described screws 40c, 40d, and 40f according to the other configuration examples. In that case, discharge of the sludge to the downstream side from the sludge passage 43 may become slow, and mixing ability of the inorganic flocculant F2 may also be reduced.

Figure 10B:
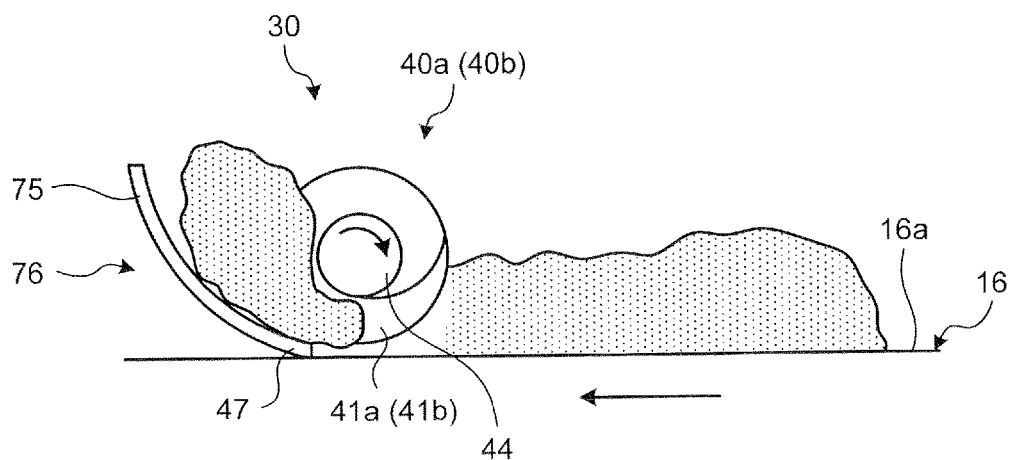
FIG. 10B is a diagram illustrating an example of a state where sludge is treated with use of the guide plate according to the modified example.

Therefore, instead of the guide plate 42a (42b), as shown in FIG. 10B, a guide plate 76 may be used, which has a wall portion 75 inclined upwards in a direction gradually separating from the screw 40a (40b), that is, inclined towards a downstream side. By the use of this guide plate 76, even if the sludge has a low moisture content, is hard, and is unable to be smoothly rolled into the screw 40a (40b), since the wall portion 75 is inclined to the downstream side, the sludge is able to be prevented from tumbling down to the upstream side of the screw 40a (40b) and the sludge is able to be introduced to the sludge passage 43 quickly.

As described above, if the sludge has a low moisture content and is hard, in addition to the sludge not being smoothly rolled into the screw 40a or the like and the sludge tumbling down to the upstream side of the screw 40a or the like, there is a possibility that the sludge may fall to the downstream side by overriding the guide plate 42a or the like. If that happens, the sludge not mixed sufficiently with the inorganic flocculant F2 will be discharged to the downstream side of the moving mechanism 30.

Figure 11A:
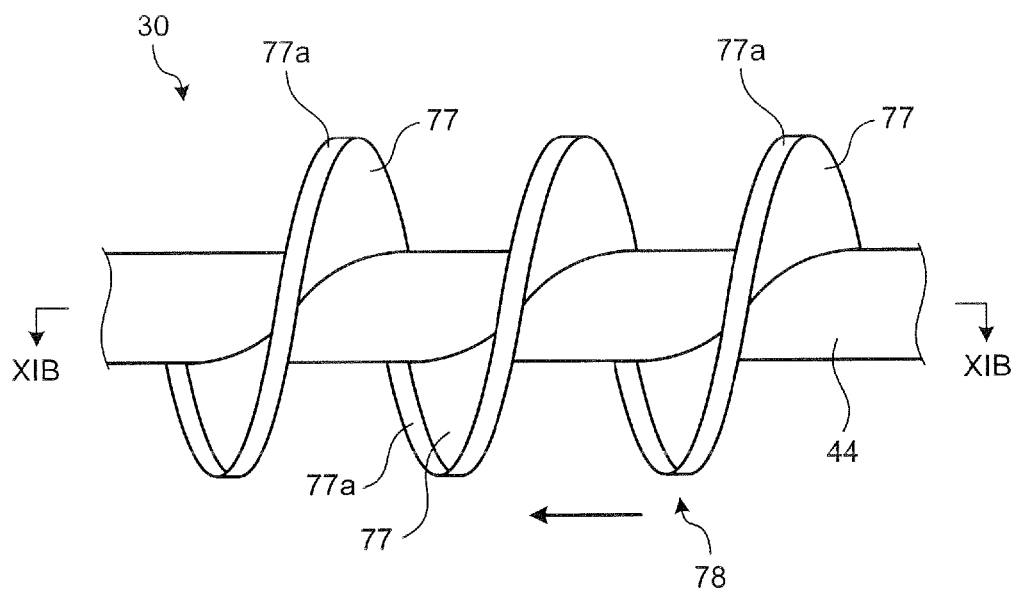
FIG. 11A is a diagram illustrating a front view of a screw blade according to a modified example.
Figure 11B:
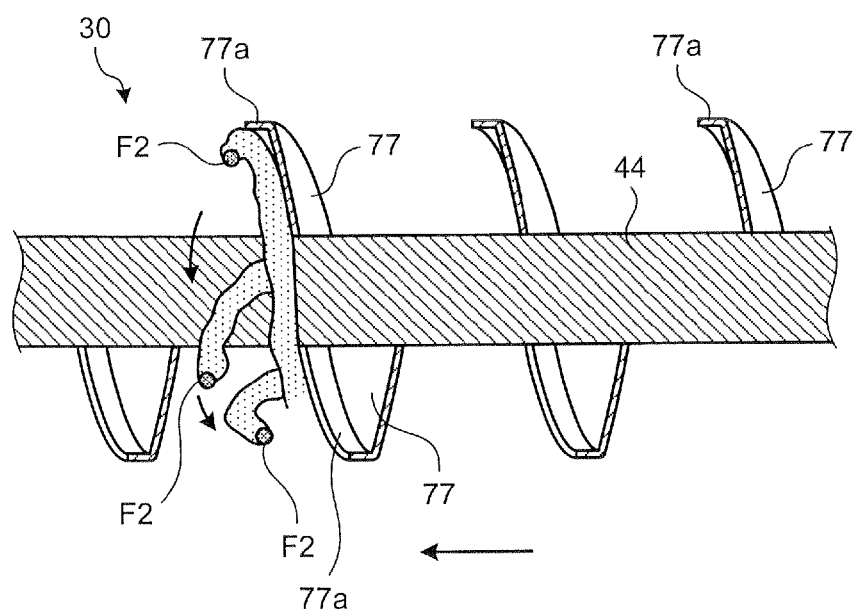
FIG. 11B is a cross section diagram along an XIB-XIB line in FIG. 11A.

Accordingly, as shown in FIGS. 11A and 11B, a screw 78 may be used, which has a screw blade 77 formed with a flange 77a by an outer peripheral edge portion thereof being bent, instead of the screw blade 41a (41b). The flange 77a is formed by bending the outer peripheral edge portion of the screw blade 77 to a front side in a sludge moving direction of the screw 78.

By the use of this screw 78, even if the sludge has a low moisture content and is hard, the sludge rolled in by the screw blade 77 is forcedly moved in a proper moving direction by the flange 77a. Therefore, the sludge is able to be prevented from falling down to the downstream side by overriding the guide plate 42a or the like and the inorganic flocculant F2 is able to be mixed into the sludge well further.

As described above, in order to prevent the sludge from falling down to the upstream side and downstream side of the screws 40a and 40b without being sufficiently mixed and consolidated, as shown in FIG. 12, above the screws 40a and 40b, a sludge fall preventing mechanism 80 may be provided, which prevents overflow of the sludge to the upstream side and downstream side.

Figure 12A:
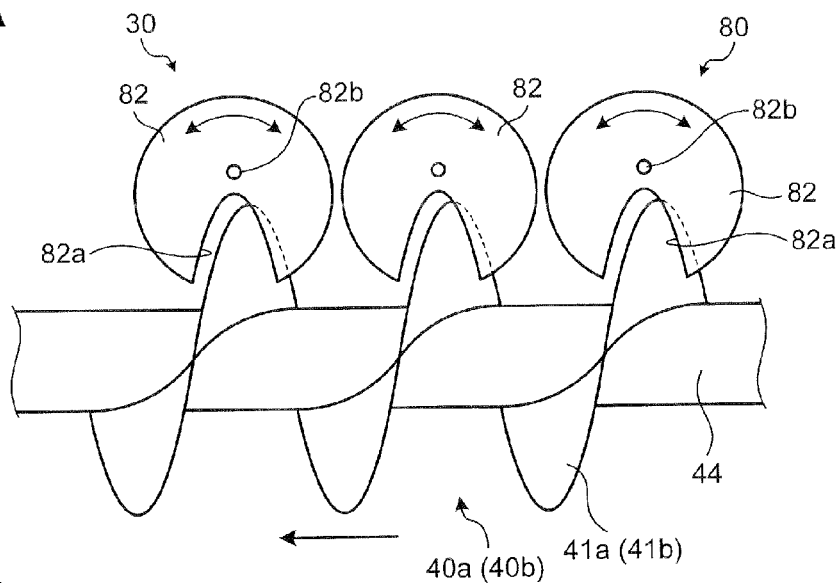
FIG. 12A is a front view of a screw provided with a sludge fall preventing mechanism.
Figure 12B:
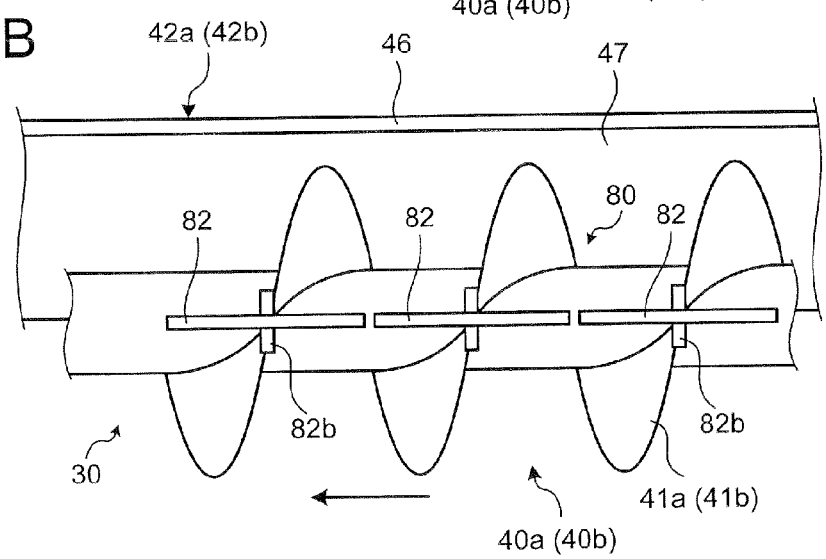
FIG. 12B is a plan view of a screw provided with a sludge fall preventing mechanism.

As shown in FIG. 12A and FIG. 12B, the sludge fall preventing mechanism 80 includes rotating plates (swinging plates) 82, which are plurally arranged along the screw shaft 44 above the screw blade 41a (41b) and let the screw blade 41a (41b) be placed (inserted) into approximately V-shaped notches 82a thereof.

The rotating plates 82 are disks, which have circular outer shapes in a front view thereof shown in FIG. 12A, and which are pivotally supported freely rotatably in a left-right direction in a vertical plane thereof by rotational axes 82b extending in a direction orthogonal to a direction in which the screw shaft 44 extends (traveling direction of the filter cloth belt 16). The notches 82a are formed in approximately triangular shapes so as to be spread from the approximate center of the rotating plates 82 in a lower side radially outward direction. As shown in FIG. 12B, in this embodiment, although the rotating plates 82 are arranged above the center of the screw shaft 44, the rotating plates 82 may be arranged at positions somewhat offset to an upstream side or downstream side of the screw shaft 44 in the traveling direction of the filter cloth belt 16.

Figure 12C:
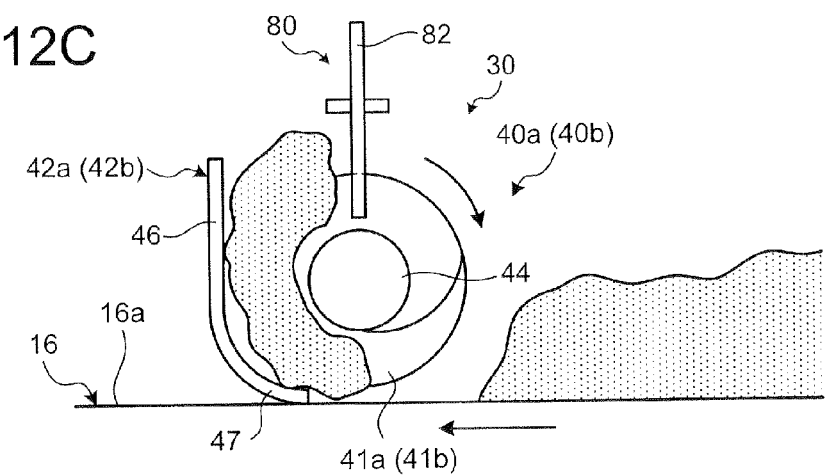
FIG. 12C is a side view of a screw provided with a sludge fall preventing mechanism.

By using this sludge fall preventing mechanism 80, when the screw 40a (40b) is driven to be rotated and the screw blade 41a (41b) rotates so as to draw a spiral, edge portions of the notches 82a are pressed by the screw blade 41a (41b) and the rotating plates 82 are drivenly rotated (drivenly swung) in the vertical plane about the rotational axes 82b. That is, as the screw 40a (40b) rotates, the rotating plates 82 performs pendular movement about the rotational axes 82b and will not hinder the rotation of the screw 40a (40b). Thereby, since, in a space above the screw blade 41a (41b), the respective rotating plates 82, which are arranged along the screw shaft 44 and perform the pendular movement, function as a partition wall that divides between an upstream side and a downstream side of the screw 40a (40b); as shown in FIG. 12C, the sludge rolled up by the screws 40a and 40b is prevented from falling down to the upstream side of the screws 40a and 40b.

Figure 13A:
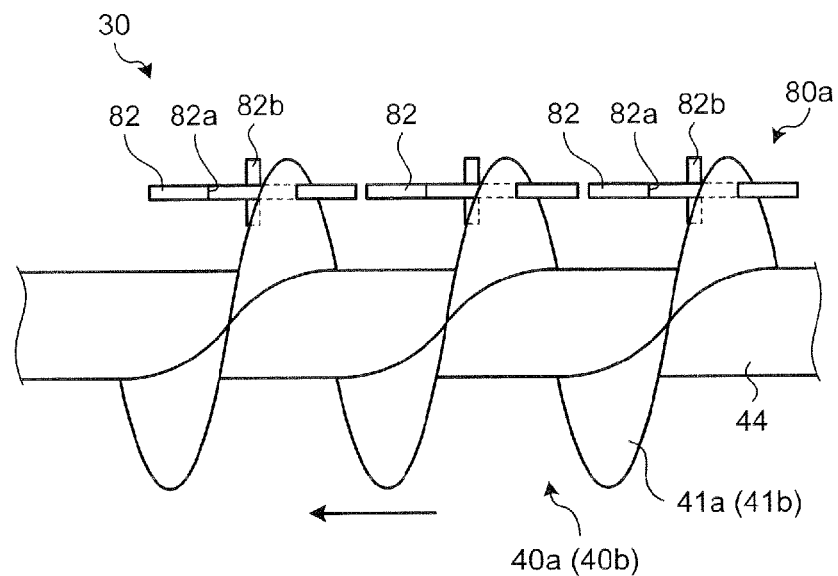
FIG. 13A is a front view of a screw provided with a sludge fall preventing mechanism according to a first modified example.
Figure 13B:
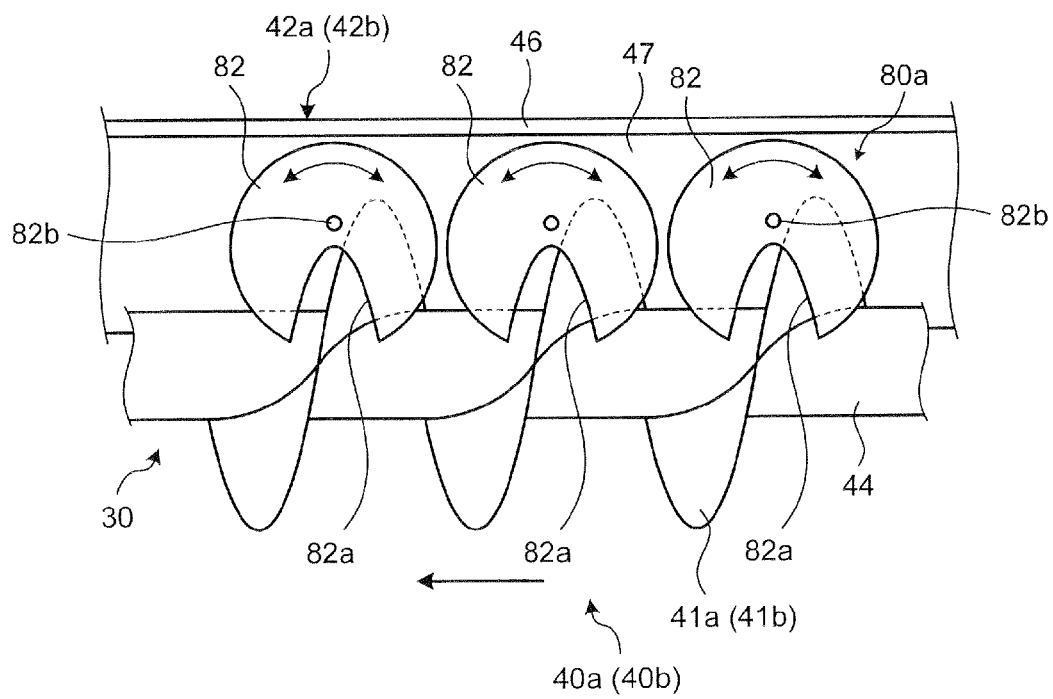
FIG. 13B is a plan view of a screw provided with a sludge fall preventing mechanism according to a first modified example.

FIG. 13 is a structural diagram of a sludge fall preventing mechanism 80a according to a first modified example, FIG. 13A being a front view thereof and FIG. 13B being a plan view thereof.

As shown in FIG. 13A and FIG. 13B, the sludge fall preventing mechanism 80a has a configuration that is approximately the same as the sludge fall preventing mechanism 80 shown in FIG. 12, except that the position to arrange the rotating plates 82 has been modified. In the sludge fall preventing mechanism 80a, the rotating plates 82 are horizontally oriented to be parallel to the filter cloth belt 16 and arranged close to a top portion of the screw 40a (40b) at a downstream side thereof in the sludge conveyance direction of the filter cloth belt 16.

In the sludge fall preventing mechanism 80a, the rotating plates 82 are pivotally supported to be freely rotatable in a left-right direction in a horizontal plane by the rotational axes 82b extending in the vertical direction. Further, the notches 82a are inserted into a downstream upper position of the screw blade 41a (41b).

Therefore, by the use of this sludge fall preventing mechanism 80a, as the screw 40a (40b) is driven to be rotated and the screw blade 41a (41b) rotates so as to draw a spiral, the edge portions of the notches 82a are pressed by the screw blade 41a (41b) and the rotating plates 82 are drivenly rotated (drivenly swung) in the horizontal plane about the rotational axes 82b. Thereby, downstream from the screw blade 41a (41b); as shown in FIG. 13B, above a space between the guide plates 42a (42b) and the screw 40a (40b) is covered by the respective rotating plates 82, which are arranged along the screw shaft 44 and which perform the pendular movement. That is, the respective rotating plates 82 function as a lid member that covers an upper opening of the space between the guide plates 42a (42b) and the screw 40a (40b) at the downstream side of the screw 40a (40b). Accordingly, the sludge rolled up by the screw 40a or 40b is prevented from falling down to the downstream side and upstream side of the screw 40a (40b).

Although in the sludge fall preventing mechanisms 80 and 80a shown in FIG. 12 and FIG. 13, the configuration, which uses the circular rotating plates 82 as sludge fall preventing plates for preventing outflow of the sludge rolled up by the screw 40a (40b), has been described as an example; the shape of these sludge fall preventing plates may, of course, have a shape other than a circular shape.

Figure 14:
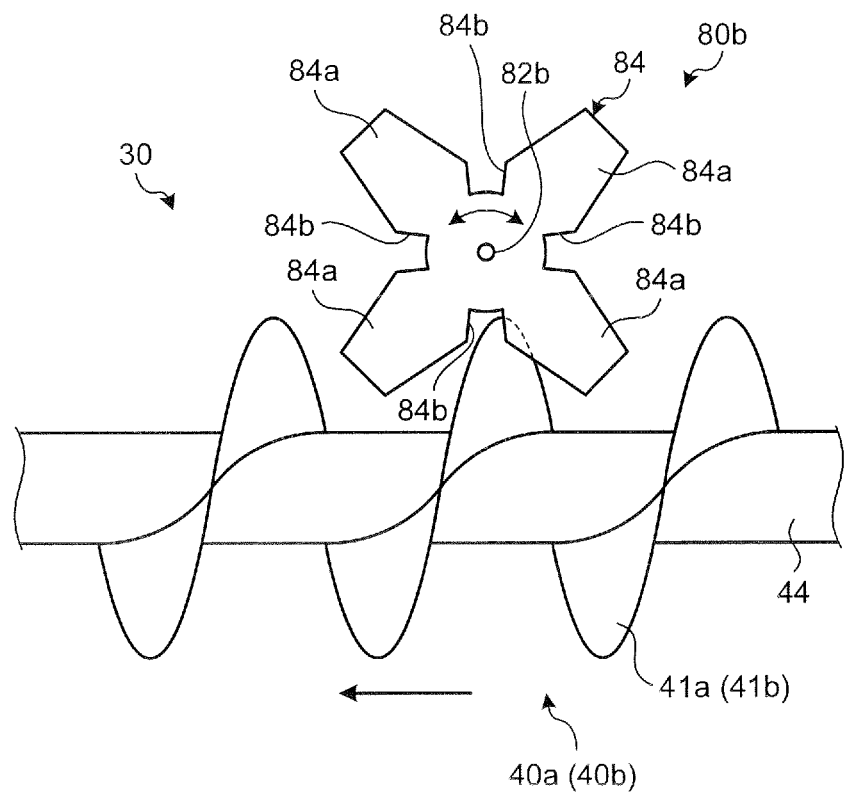
FIG. 14 is a front view of a sludge fall preventing mechanism according to a second modified example.

For example, FIG. 14 illustrates a front view of a sludge fall preventing mechanism 80b according to a second modified example having a cross-shaped rotating plate 84. As shown in FIG. 14, the rotating plate 84 has four tapered protruded pieces 84a, which extend from the center thereof pivotally supported by the rotational axis 82b, in directions crossing each other at 90 degrees, and notches 84b, into which the screw blade 41a (41b) is inserted, are formed between the respective protruded pieces 84a. Although in FIG. 14, only one rotating plate 84 is shown, similarly to the above described rotating plates 82, a plurality of the rotating plates 84 are provided side by side above or downstream from the screw 40a (40b). In this sludge fall preventing mechanism 80b also, similarly to the above described sludge fall preventing mechanisms 80 and 80a, the sludge rolled up by the screw 40a (40b) is prevented from falling down to the downstream side and upstream side of the screw 40a (40b).

Figure 15A:
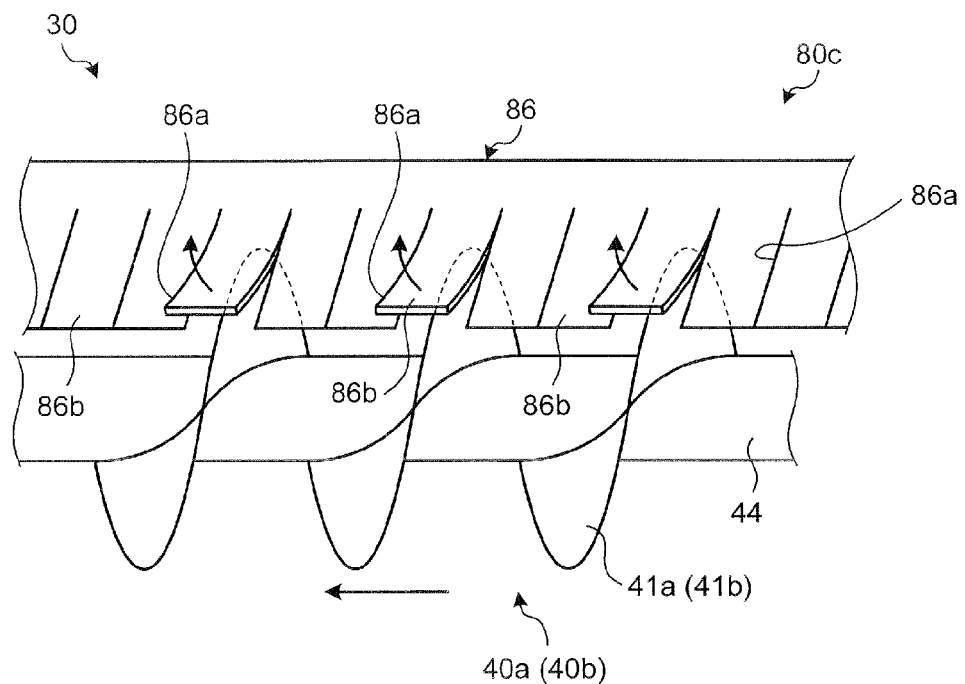
FIG. 15A is a plan view of a sludge fall preventing mechanism according to a third modified example.
Figure 15B:
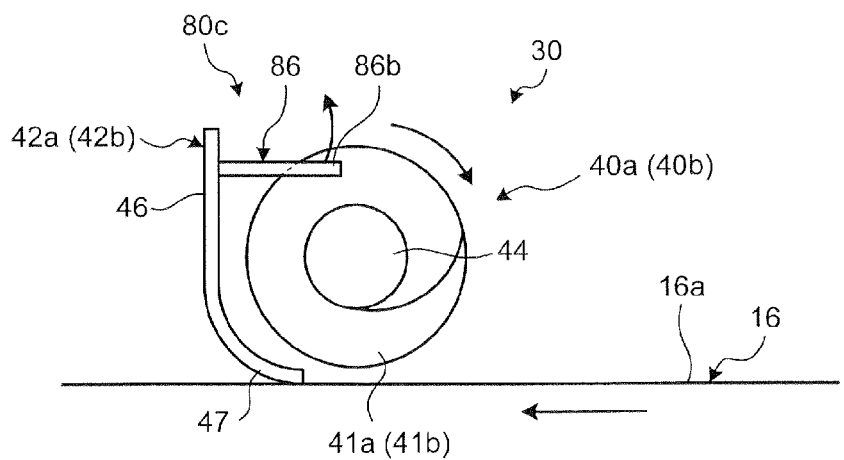
FIG. 15B is a side view of a sludge fall preventing mechanism according to a third modified example.

FIG. 15 is a structural diagram of a sludge fall preventing mechanism 80c according to a third modified example, FIG. 15A being a plan view thereof, and FIG. 15B being a side view thereof.

As shown in FIG. 15A and FIG. 15B, the sludge fall preventing mechanism 80c has a configuration in which the respective rotating plates 82 and their rotational axes 82b forming the sludge fall preventing mechanism 80a shown in FIG. 13 have been replaced with a long plate 86 provided with slits 86a in the direction the screw shaft 44 extends.

The plate 86 projects over in the horizontal direction from a screw 40a (40b) side surface of the guide plate 42a (42b), and a distal end side thereof is set at a position to come into contact with the screw blade 41a (41b) (see FIG. 15B). The slits 86a are formed towards a proximal end side (guide plate 42a side) from a distal end side end portion of the plate 86, and a slit depth (distance) thereof is set to not reach a proximal end side end portion of the plate 86 (see FIG. 15A).

Thereby, in the plate 86, a plurality of plate pieces 86b, which are formed by the respective slits 86a such that proximal end portions thereof are connected with one another, are formed in parallel, and each of the plate pieces 86b is configured to be arranged at a position above the screw blade 41a (41b). The plate 86 is formed of, for example, a metallic thin plate having certain elasticity and each of the plate pieces 86b is able to be swung in an up-down direction with its proximal end side being a turning base. The plate 86 may be formed of a rubber plate, or the like.

Therefore, by the use of this sludge fall preventing mechanism 80c, as the screw 40a (40b) is driven to be rotated and the screw blade 41a (41g) rotates so as to draw a spiral, each of the plate pieces 86b is flipped up upwards by the screw blade 41a (41b) from a lower surface side thereof and is elastically deformed upwards. That is, each of the plate pieces 86b moves up and down approximately in the same way as a vibration valve of a general music box. Therefore, at a downstream side of the screw blade 41a (41b), approximately in the same way as the rotating plates 82 of the sludge fall preventing mechanism. 80a shown in FIG. 13; as shown in FIG. 15B, since above the space between the guide plate 42a (42b) and the screw 40a (40b) is covered by the plate 86 extending along the screw shaft 44, the sludge rolled up by the screws 40a and 40b is prevented from falling down to the downstream side and upstream side of the screw 40a (40b).

These sludge fall preventing mechanisms 80 and 80a to 80c may be arranged for the screws 40c to 40f other than the screws 40a and 40b, of course.

As described above, in the moving mechanism 30 shown in FIG. 2, the paddles 45 are provided on the outer peripheral surface of the screw shaft 44 at the center of the pair of left and right screws 40a and 40b, so that the sludge consolidated to the center by the screws 40a and 40b is able to be smoothly discharged to the downstream side. The paddles 45 are, as shown in FIG. 2, plate pieces protruding in a radially outward direction on the outer peripheral surface of the screw shaft 44, but as shown in FIG. 16, the paddles 45 may be configured as paddles 45a with their orientations being changeable.

Figure 16A:
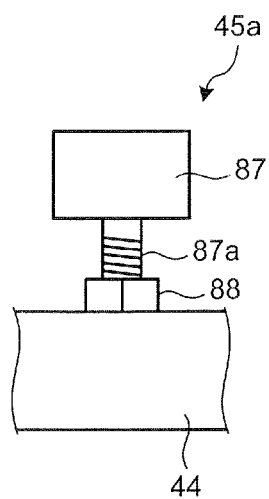
FIG. 16A being a front view of a paddle according to a modified example.
Figure 16B:
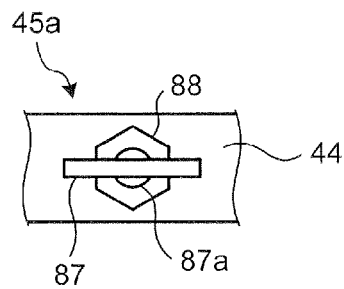
FIG. 16B is a plan view of a paddle according to a modified example.
Figure 16C:
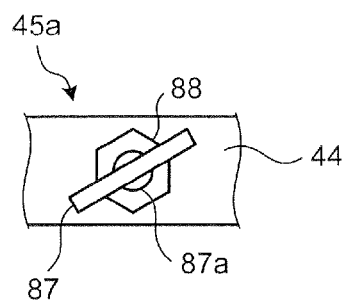
FIG. 16C is a plan view of a state where an angle of the paddle has been changed.

As shown in FIG. 16A and FIG. 16B, the paddle 45a has a thin plate piece 87 that scrapes out the sludge and the paddle 45a is fixed by a screw stock 87a being screwed with a nut 88 connected to the outer peripheral surface of the screw shaft 44, the screw stock 87a protruding from the center of the proximal end surface of this plate piece 87. That is, by changing the screwed angle of the screw stock 87a to the nut 88 as appropriate, an angle of the plate piece 87 is able to be set at an arbitrary orientation (for example, see FIG. 16C) and the sludge collected at the center between the screws 40a and 40b is able to be efficiently sent out to the sludge passage 43. In order to strengthen the fastened state between the screw stock 87a and the nut 88 further, a screw locking agent, a double nut, or the like not shown may be used.

Although the configuration of the moving mechanism 30 or the like that moves the sludge by using the screw 40a and the like has been described above, as long as the sludge is able to be moved in the direction intersecting the conveyance direction of the filter cloth belt 16, any moving mechanism other than the configuration using the screw 40*a* may be used.

Figure 17:
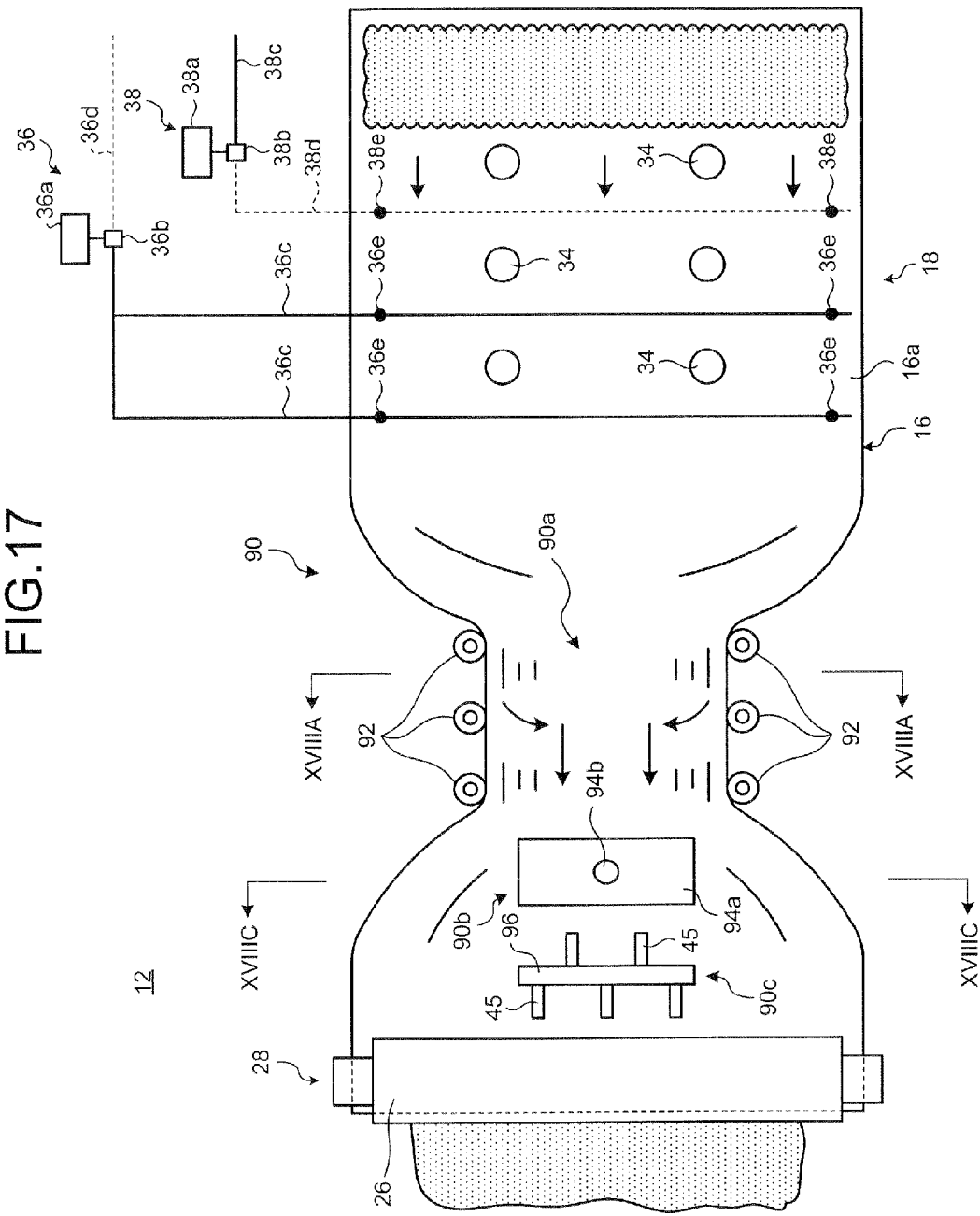
FIG. 17 is a plan view of a concentration apparatus including a moving mechanism formed with a filter cloth belt thereof being modified.

FIG. 17 is a plan view of the concentration apparatus 12 including a moving mechanism 90 formed by modifying the filter cloth belt 16, and FIG. 18 is an operational diagram illustrating how the sludge is moved by the moving mechanism 90 shown in FIG. 17.

Figure 18A:
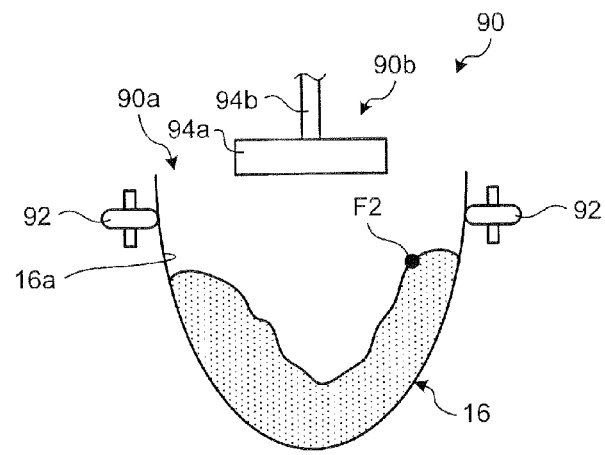
FIG. 18A is a cross section diagram along an XVIIIA-XVIIIA line in FIG. 17.

As shown in FIG. 17 and FIG. 18A, the moving mechanism 90 includes a valley portion 90*a*, which is U-shaped and moves the sludge in the width direction of the filter cloth belt 16, by: both sides of a part of the filter cloth belt 16 being lifted up and brought close to each other, the part forming the filtering unit 18 between the addition nozzles 36*e* of the second chemical feeder 36 and the pressurizing unit 28; and an outer side surface thereof (lower surface of the filter cloth belt 16) being slidably supported by a plurality of rollers 92. Further, the moving mechanism 90 includes a pressing unit 90*b* and a stirring unit 90*c*, which are arranged side by side in order along the sludge conveyance direction, at a position away from restriction of the rollers 92 and returned to the original width dimension (or a position where it is attempted to return to the original width dimension), the position being at an outlet side of the valley portion 90*a*.

The pressing unit 90*b* includes, for example: a pressing plate 94*a*, which is rectangular shaped in a plan view; and a supporting rod 94*b*, which moves the pressing plate 94*a* up and down and is connected to a drive mechanism not shown. The stirring unit 90*c* has a plurality of paddles 45 that are the same as those of the moving mechanism 30, the plurality of paddles 45 protruding from an outer peripheral surface of a rotational shaft 96 connected to a drive mechanism not shown.

Figure 18B:
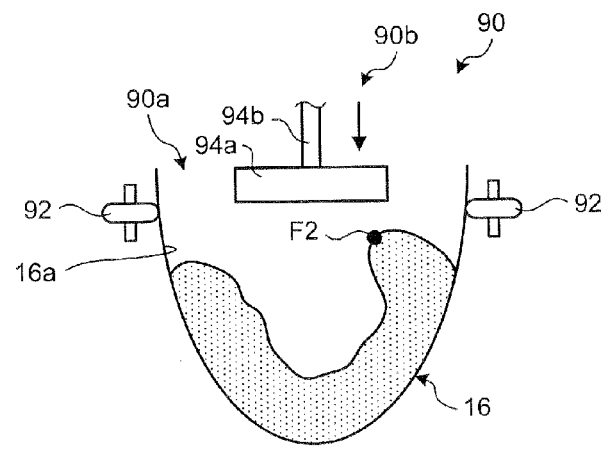
FIG. 18B is a cross section diagram illustrating a state where the sludge has been conveyed from the state shown in FIG. 18A.
Figure 18C:
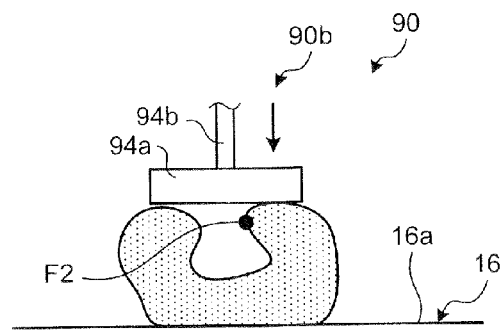
FIG. 18C is a cross section diagram along an XVIIIC-XVIIIC line in FIG. 17.

Therefore, by this moving mechanism 90, as the sludge, which is added with the inorganic flocculant F2 by the second chemical feeder 36 and conveyed on the filter cloth belt 16 while being concentrated in the filtering unit 18, reaches the valley portion 90*a*; as shown in FIG. 18A, first, the sludge starts to fall down towards the bottom of the valley while going on slopes formed by the top surface 16*a* at both side portions forming the valley portion 90*a*. As shown in FIG. 18B, the sludge then is gradually moved to the bottom of the valley while being conveyed in the valley portion 90*a* to be consolidated, and thereafter, as shown in FIG. 18C, the sludge is pressed by the pressing unit 90*b* on the filter cloth belt 16 and becomes a somewhat small lump in a state where the inorganic flocculant F2 has been sufficiently mixed into the sludge. Thereafter, after the sludge, into which the inorganic flocculant F2 has been mixed, is sufficiently mixed with the inorganic flocculant F2 further by being stirred by the stirring unit 90*c*, the sludge is introduced into the pressurizing unit 28, and thus dewatering efficiency of the dewatering apparatus 14 is also improved. One or both of the pressing unit 90*b* and the stirring unit 90*c* may be omitted depending on characteristics of the sludge to be treated or the like.

In this configuration using the moving mechanism 90 also, in approximately the same way as that in the configuration using the above described moving mechanism 30 or the like, in the concentration apparatus 12, by moving the sludge in the direction intersecting the conveyance direction of the filter cloth belt 16 in the moving mechanism 90 after the second chemical agent is added to the sludge that has been concentrated to a certain degree by the sludge being added with the first chemical agent and subjected to gravity filtration in the filtering unit 18; the sludge is able to be sufficiently kneaded with the second chemical agent and consolidated further. Therefore, by using the moving mechanism 90, even with a simple configuration omitting the screw 40*a* and the like, the concentration and dewatering ratio of the sludge in the concentration apparatus 12 are able to be improved and the resulting concentration is able to be increased.

Figure 19:
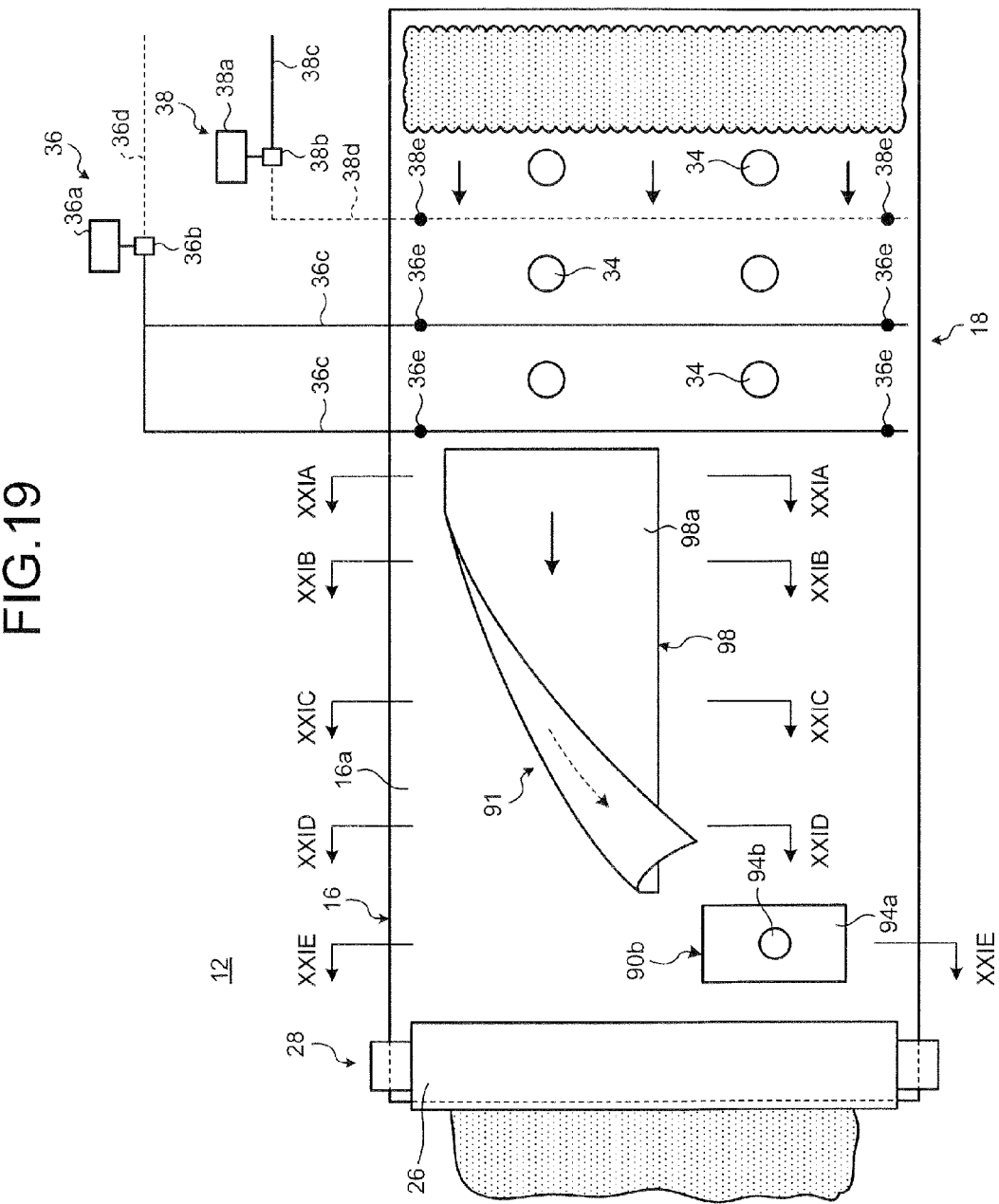
FIG. 19 is a plan view of a concentration apparatus including a moving mechanism provided with a curling plate on a filter cloth belt thereof.
Figure 20:
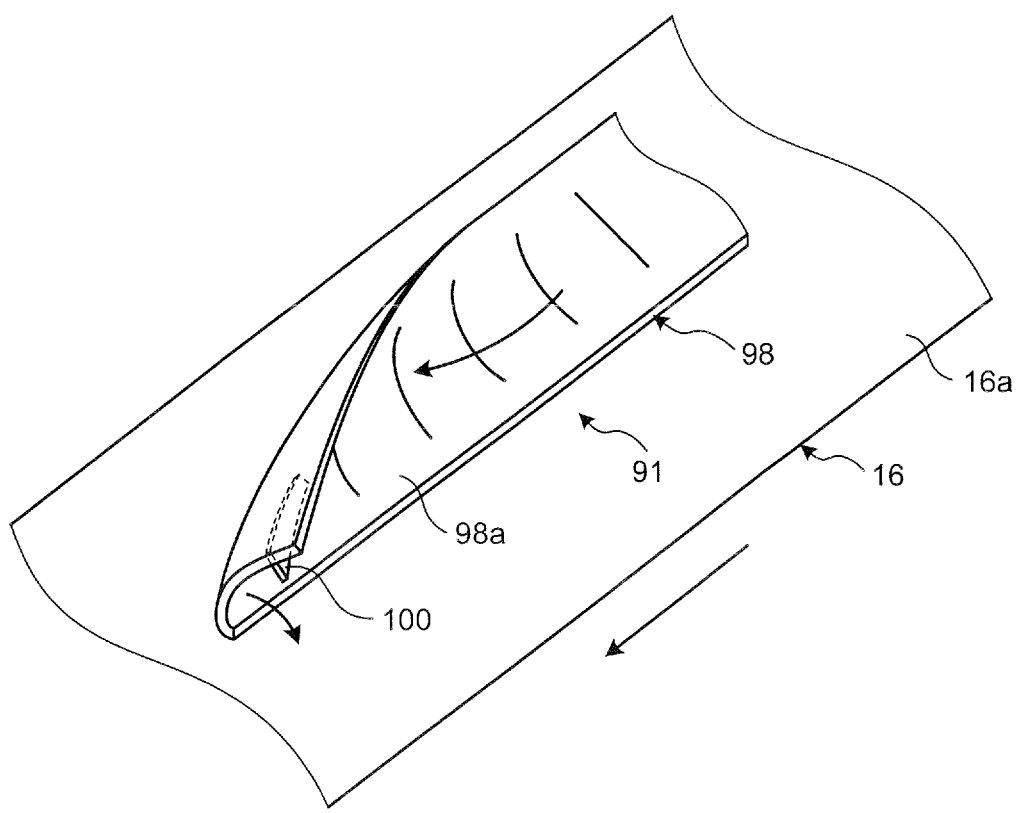
FIG. 20 is a perspective view illustrating the curling plate shown in FIG. 19 and a periphery thereof.

FIG. 19 is a plan view of the concentration apparatus 12 including a moving mechanism 91 provided with a curling plate 98 on the filter cloth belt 16, and FIG. 20 is a perspective view illustrating the curling plate 98 shown in FIG. 19 and a periphery thereof. Further, FIG. 21 is an operational diagram illustrating how the sludge is moved by the moving mechanism 91 shown in FIG. 19.

As shown in FIG. 19 and FIG. 20, the moving mechanism 91 includes: the curling plate 98, which is arranged from the center to one side of the filter cloth belt 16 forming the filtering unit 18 between the addition nozzles 36*e* of the second chemical feeder 36 and the pressurizing unit 28 and which extends in the traveling direction of the filter cloth belt 16; and the pressing unit 90*b*, which is arranged downstream from the curling plate 98 on the other side. The pressing unit 90*b* has a configuration that is the same as that of the pressing unit 90*b* of the moving mechanism 90 shown in FIG. 17.

The curling plate 98 is an abutment plate for moving the sludge conveyed on the filter cloth belt 16 in the direction intersecting the conveyance direction. As shown in FIG. 19 and FIG. 20, the curling plate 98 forms a roll, which is formed by, from an upstream side to a downstream side in the sludge conveyance direction, one side end of the plate corresponding to a width dimension that is about a half of the width dimension of the filter cloth belt 16 being gradually lifted upwards to be eventually curled up to a position where the one side end goes over the top of the other side end thereof.

Figure 21A:
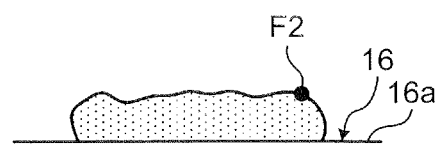
FIG. 21A is a cross section diagram along a XXIA-XXIA line in FIG. 19.
Figure 21B:
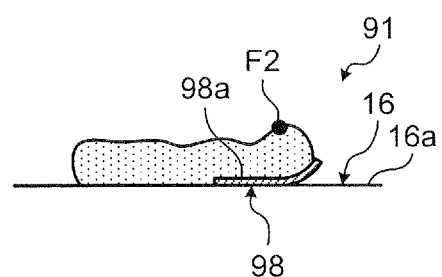
FIG. 21B is a cross section diagram along a XXIB-XXIB line in FIG. 19.
Figure 21C:
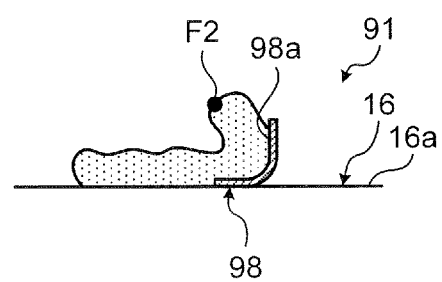
FIG. 21C is a cross section diagram along a XXIC-XXIC line in FIG. 19.
Figure 21D:
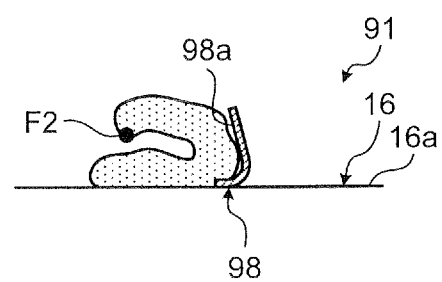
FIG. 21D is a cross section diagram along a XXID-XXID line in FIG. 19.
Figure 21E:
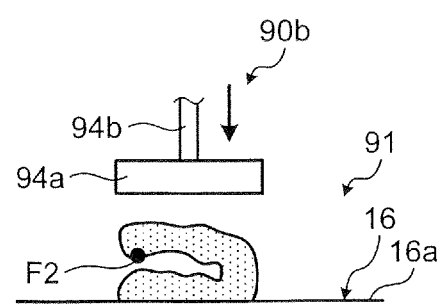

Therefore, by this moving mechanism 91, as the sludge, which is added with the inorganic flocculant F2 by the second chemical feeder 36 and conveyed on the filter cloth belt 16 while being concentrated in the filtering unit 18, reaches the curling plate 98 (see FIG. 21A and FIG. 21B); while sliding on a top surface 98*a* thereof, along with a curled shape of the top surface 98*a*, the sludge goes on the inclined surface and starts to fall towards the other side (see FIG. 21C). As shown in FIG. 21D, after being consolidated by being gradually moved onto the filter cloth belt 16 while being conveyed on the top surface 98*a* of the curling plate 98, the sludge is, as shown in FIG. 21E, pressed on the filter cloth belt 16 by the pressing unit 90*b*, becomes a somewhat small lump in a state where the inorganic flocculant F2 has been mixed into the sludge, and is introduced into the pressurizing unit 28. In the moving mechanism 91 also, similarly to the moving mechanism 90 shown in FIG. 17, a stirring unit 90*c* may be arranged downstream from the pressing unit 90*b*. Further, the pressing unit 90*b* may also be omitted depending on characteristics of the sludge to be treated, or the like.

As described above, as to the configuration using the moving mechanism 91 also, approximately in the same way as in the configuration using the above described moving mechanism 30 or the like, in the concentration apparatus 12, by moving the sludge in the direction intersecting with the conveyance direction of the filter cloth belt 16 in the moving mechanism 91 after the second chemical agent is added to the sludge that has been concentrated to a certain degree by being added with the first chemical agent and subjected to gravity filtration in the filtering unit 18; upon this movement, the sludge is able to be sufficiently kneaded with the second chemical agent and consolidated further. Therefore, by using the moving mechanism 91, even with a simple configuration omitting the screw 40*a* and the like, the concentration and dewatering ratio of the sludge in the concentration apparatus 12 are able to be improved, the resulting concentration is able to be increased, and the dewatering efficiency in the dewatering apparatus 14 is able to be improved also.

In order to promote the falling and consolidation of the sludge near the outlet of the curling plate 98 in the moving mechanism 91, on the top surface 98*a* of a downstream outlet portion of the curling plate 98, a returning plate 100 for scraping off the sludge may be provided (see FIG. 20). The returning plate 100 is, for example, a short plate, and may be arranged at a position close to one side end (top end) of an outlet portion of the curling plate 98. Further, in the moving mechanism 91, without providing the curling plate 98, approximately in the same way as that in the case of the moving mechanism 90 shown in FIG. 17, by lifting up one side of the filter cloth belt 16, a curling surface may be formed of the top surface 16*a* thereof.

As shown in FIG. 2, FIG. 5 to FIG. 7, FIG. 17, and FIG. 19, the configuration in which, in the concentration apparatus 12, upstream of the moving mechanism 30, 30*a*, 30*b*, 30*c*, 90, or 91, three rows of the pole bodies 34, each row consisting of a pair of the pole bodies 34, are provided along the sludge conveyance direction, has been described as an example above, and the position to arrange these pole bodies 34, the number and shape of these pole bodies 34, and the like have been described as being able to be modified as appropriate.

In the sludge dewatering system 10 according to this embodiment, the filtering unit 18 forming the upper stage concentration apparatus 12 includes the second chemical feeder 36 (addition nozzles 36*e*), which adds the inorganic flocculant F2 to the sludge, and the moving mechanism 30 (30*a*, 30*b*, 30*c*, 90, or 91), which consolidates the sludge by moving the sludge added with the inorganic flocculant F2 by the second chemical feeder 36 and causes the inorganic flocculant F2 to be sufficiently kneaded therein. Therefore, if the arrangement of the pole bodies 34 upstream of the moving mechanism 30 or the like is set as appropriate: the sludge is able to be gathered near the addition nozzles 36*e* where the inorganic flocculant F2 is added to the sludge; the sludge is able to be introduced into the moving mechanism 30 or the like after intensive addition of the inorganic flocculant F2 to the gathered sludge; and mixing ability of the inorganic flocculant F2 into the sludge is also able to be increased further.

Figure 22:
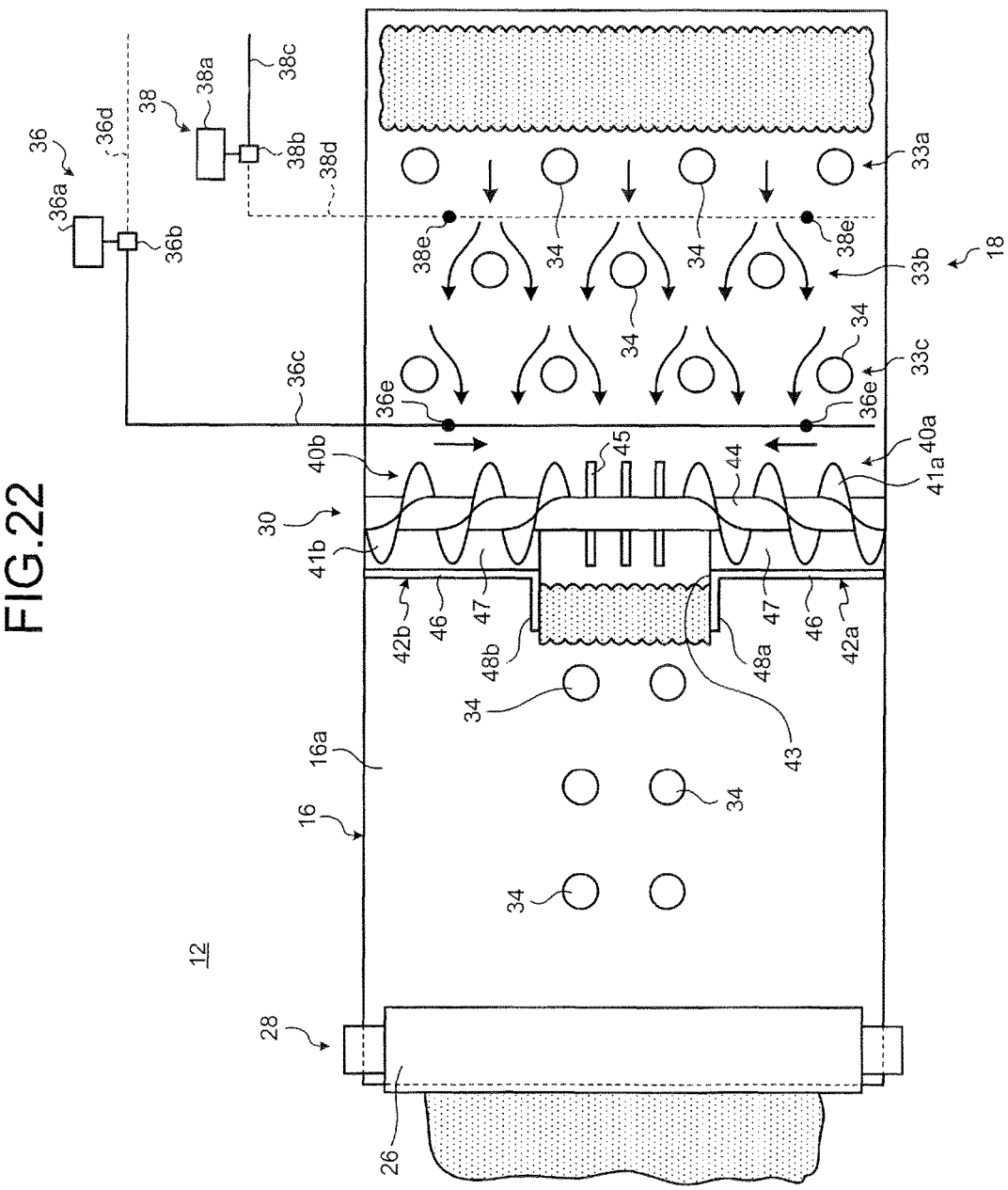
FIG. 22 is a plan view of a concentration apparatus, to which a pole body arrangement according to a modified example has been applied.

For example, as shown in FIG. 22, a configuration may be adopted, in which: along the sludge conveyance direction, a first row 33*a* having four of the pole bodies 34 arranged therein, a second row 33*b* having three of the pole bodies 34 arranged therein, and a third row 33*c* having four of the pole bodies 34 arranged therein are arranged; and the three pole bodies 34 of the second row 33*b* are arranged in respective gaps (among the pitch) among the sets of the four pole bodies 34 of the first row 33*a* and the third row 33*c* in the width direction of the filter cloth belt 16. As a result, as shown in FIG. 22 with arrows, by the respective pole bodies 34 of the first row 33*a*, the second row 33*b*, and the third row 33*c*, much of the sludge conveyed on the filter cloth belt 16 is gathered near the addition nozzles 36*e* arranged at both sides of the filter cloth belt 16. Thereby, since the sludge is introduced into the moving mechanism 30 or the like after the inorganic flocculant F2 is intensively added to the gathered sludge, the mixing ability of the inorganic flocculant F2 into the sludge is able to be increased widely.

In the above description, as shown in FIG. 1, FIG. 2, FIG. 5, and FIG. 6, the configuration (sludge leveling mechanism) has been described as an example, in which, in the concentration apparatus 12: at the position downstream from the moving mechanism 30, 30*a*, or 30*b* and upstream of the pressurizing unit 28, the plurality of the pole bodies 34 are arranged; and after the sludge consolidated by the moving mechanism 30 or the like is scattered and leveled to a certain degree by these pole bodies 34, the sludge is introduced into the primary dewatering roller 26 forming the pressurizing unit 28. This sludge leveling mechanism on the filter cloth belt 16 between the moving mechanism 30 or the like and the pressurizing unit 28 may be, of course, configured without using the pole bodies 34.

Figure 23A:
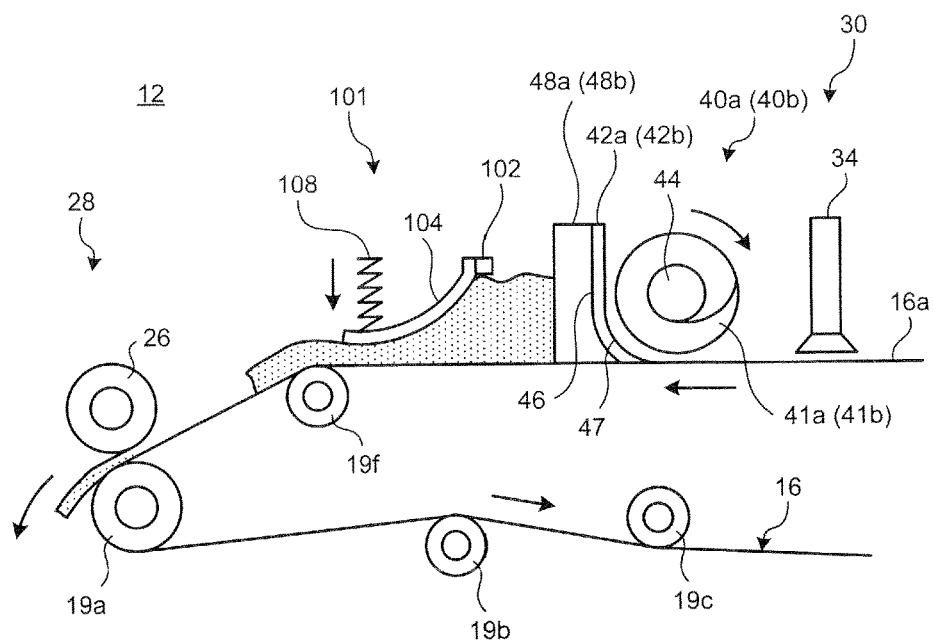
FIG. 23A is a side view of main parts of a concentration apparatus provided with a sludge leveling mechanism according to a first modified example.
Figure 23B:
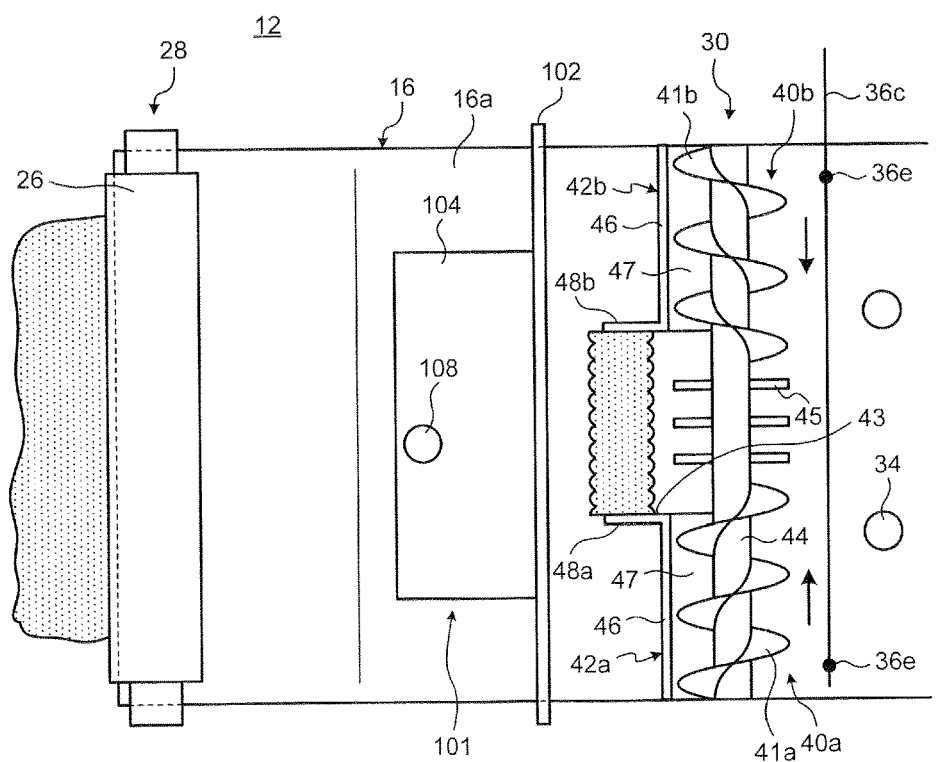
FIG. 23B is a plan view of main parts of a concentration apparatus provided, with a sludge leveling mechanism according to a first modified example.

FIG. 23 is a structural diagram illustrating main parts of the concentration apparatus 12 provided with a sludge leveling mechanism 101 according to a first modified example, FIG. 23A being a side view thereof and FIG. 23B being a plan view thereof.

As shown in FIG. 23A and FIG. 23B, the sludge leveling mechanism 101 is provided between the moving mechanism 30 and the pressurizing unit 28, and has a configuration in which a proximal end side end face of a pressing member 104 formed wider than the sludge passage 43 of the moving mechanism 30 is fixed onto a central portion of a long arm bracket 102 arranged over a width direction of the filter cloth belt 16 above the filter cloth belt 16. The pressing member 104 is, for example, a rubber sheet having a certain thickness (for example, about a few millimeters to dozens of millimeters). The pressing member 104 is biased downwards by its own weight and by a coil spring 108 arranged at a distal end side top surface side thereof, and is able to press down and level the sludge conveyed on the filter cloth belt 16.

In FIG. 23, in contrast to the configuration shown in FIG. 1, with respect to the concentration apparatus 12, a configuration is shown as an example, in which a roller 19*f*, which supports the filter cloth belt 16, is additionally arranged at a position near a downstream side of the pressing member 104 and the filter cloth belt 16 is inclined downward downstream from this roller 19*f*. By making the filter cloth belt 16 inclined, the sludge is able to be even more smoothly introduced into the pressurizing unit 28.

Therefore, by the provision of the sludge leveling mechanism 101, the sludge that has been gathered to the center and consolidated into a lump shape by the screws 40*a* and 40*b* is able to be introduced into the pressurizing unit 28 after being leveled in a flat plate shape by the pressing member 104. Accordingly, the dewatering efficiency at the primary dewatering roller 26 in the pressurizing unit 28 is able to be improved. Further, by biasing the pressing member 104 with the coil spring 108 downwards, the sludge is able to be always leveled with appropriate pressure.

Figure 24A:
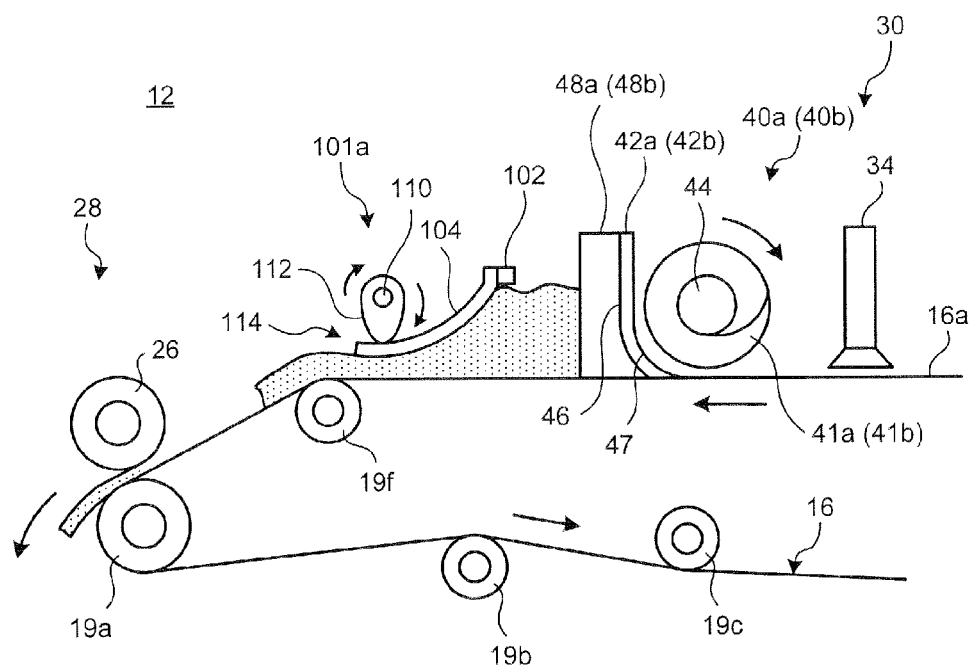
FIG. 24A is a side view of main parts of a concentration apparatus provided with a sludge leveling mechanism according to a second modified example.
Figure 24B:
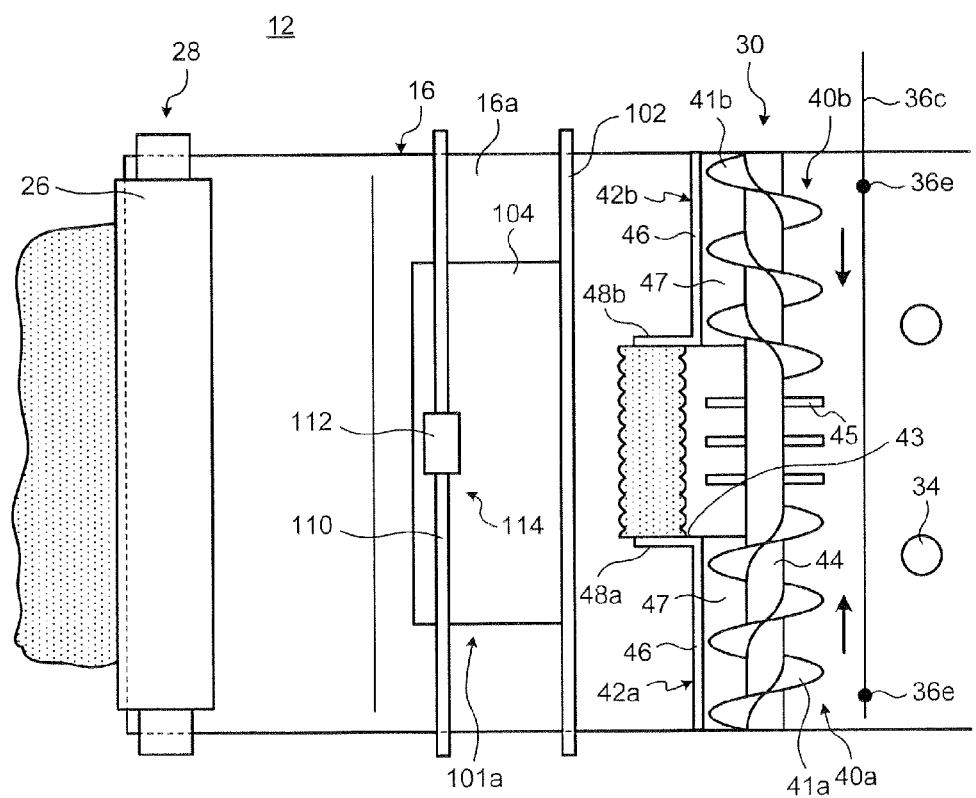
FIG. 24B is a plan view of main parts of a concentration apparatus provided with a sludge leveling mechanism according to a second modified example.

FIG. 24 is a configuration diagram illustrating main parts of the concentration apparatus 12 provided with a sludge leveling mechanism 101*a* according to a second modified example, FIG. 24A being a side view thereof and FIG. 24B being a plan view thereof.

As shown in FIG. 24A and FIG. 24B, the sludge leveling mechanism 101*a* is configured, in contrast to the sludge leveling mechanism 101 shown in FIG. 23, to include, instead of the coil spring 108, a crank shaft (cam shaft) 114, in which an elliptically shaped cam 112 is eccentrically fixed to a crank shaft 110. The crank shaft 110 is arranged over the width direction of and above the filter cloth belt 16 (and pressing member 104) and is driven to be rotated by a drive source not shown, and may be configured to be rotated synchronously with the screw shaft 44 or the like. The cam 112 is configured to have a certain thickness in a longitudinal direction of the crank shaft 110.

Therefore, by the provision of the sludge leveling mechanism 101a, the sludge that has become lump shaped by being gathered to the center and consolidated by the screws 40a and 40b is able to be introduced into the pressurizing unit 28 after being leveled into a flat plate shape by the pressing member 104. When that is done, in the sludge leveling mechanism 101a, by the crank shaft 110 being driven to be rotated, the cam 112 is also driven to be rotated, and by an elliptical outer peripheral surface thereof, pressure against the pressing member 104 is able to be changed periodically. That is, since, by the rotating cam 112, the pressure onto the sludge by the pressing member 104 periodically changes, the pressing member 104 is able to swallow and level the sludge discharged from the sludge passage 43 to level the sludge into a flat plate shape while repeating the swallowing and leveling operation, and thus the sludge collected every time is able to be leveled even more widely with higher pressure and the dewatering efficiency is improved. Further, the sludge leveling mechanism 101a is able to prevent the flowing sludge from being caught in the pressing member 104 and staying upstream of the pressing member 104 by the periodic changing of the pressure placed on the sludge from the pressing member 104.

As shown in FIG. 1 and the like, according to the above description, the moisture (filtrate) that has been solid-liquid separated from the sludge in the concentration apparatus 12 is collected by the filtrate receiving trays 32a and 32b. Normally, the filtrate collected by these filtrate receiving trays 32a and 32b is discarded, or recycled as rinse water for the filter cloth belt 16 and the like.

The concentration apparatus 12 is configured to mix the sludge while consolidating the sludge in the moving mechanism 30 after adding the inorganic flocculant F2 by the second chemical feeder to the sludge and to subject the sludge to pressure dewatering in the pressurizing unit 28. When that is done, in the first dewatering after mixing the inorganic flocculant F2 therein, a large amount of the flown out inorganic flocculant F2 is mixed in the filtrate permeating and collected through the filter cloth belt 16.

Figure 25:
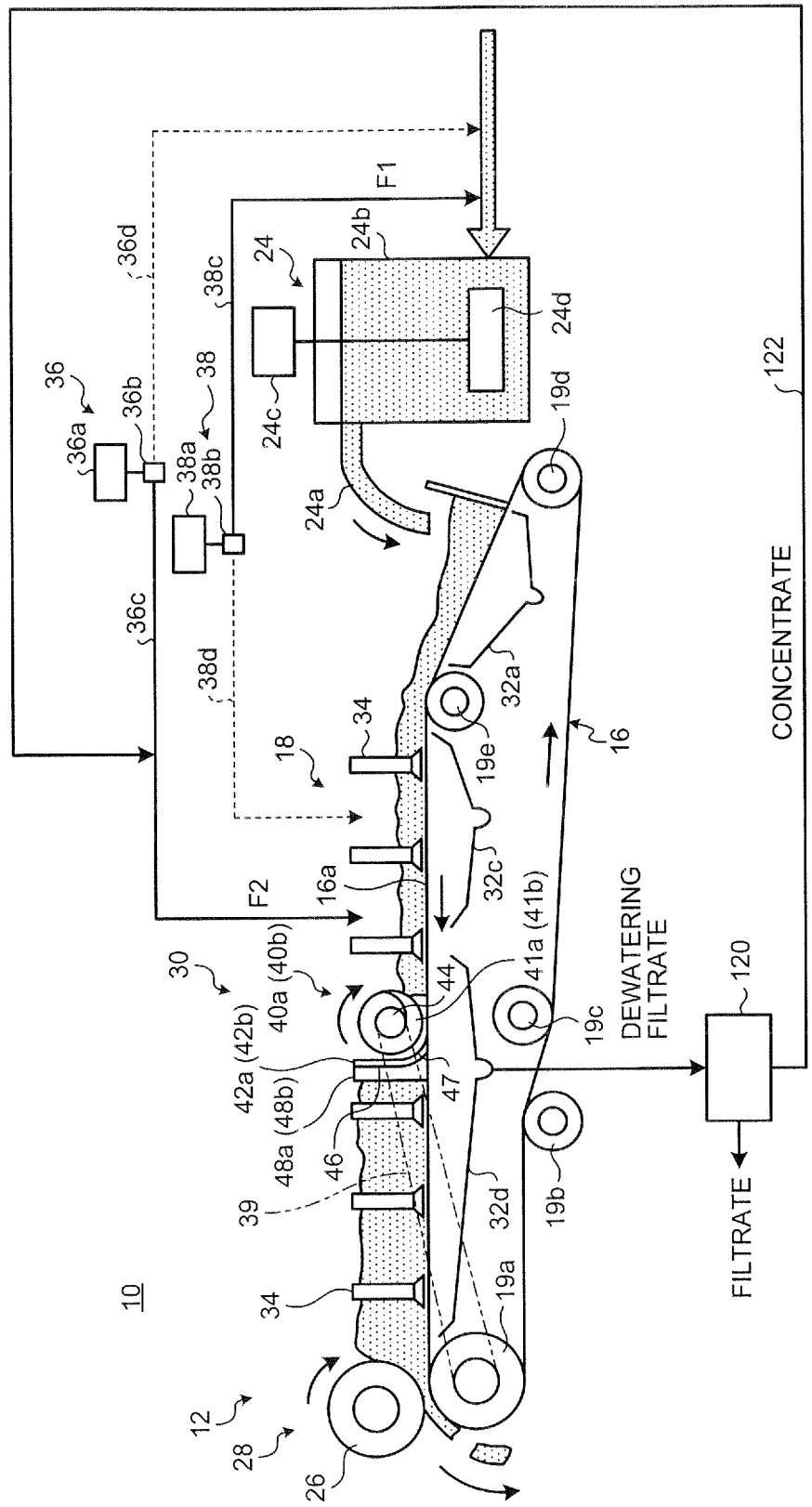
FIG. 25 is a side view illustrating a configuration of a concentration apparatus including a filtrate collecting apparatus.

Thus, as shown in FIG. 25, for example, the concentration apparatus 12 may have a configuration (filtrate collecting apparatus), in which the filtrate receiving tray 32b is replaced with two filtrate receiving trays 32c and 32d, and in particular, the filtrate receiving tray 32d, which collects the filtrate solid-liquid separated in the moving mechanism 30 and the pressurizing unit 28 after the addition of the inorganic flocculant F2 by the second chemical feeder 36, is connected to a filtrate storage and concentration tank 120. As a result, the dewatering filtrate from the moving mechanism 30 and the pressurizing unit 28, the dewatering filtrate having been mixed with a large amount of the inorganic flocculant F2, is stored in the filtrate storage and concentration tank 120 and the inorganic flocculant F2 is concentrated, and thus this concentrate is able to be introduced into the first line 36c of the second chemical feeder 36 by a concentrate line (line) 122. Therefore, the inorganic flocculant F2 is able to be recycled while being collected effectively, the amount of the chemical agent used is able to be reduced further, and the cost therefor is able to be reduced. If the amount of the inorganic flocculant F2 included in the liquid flowing through the concentrate line 122 is very small, the liquid may be returned to the tank 24b of the flocculation mixing tank 24.

Figure 26:
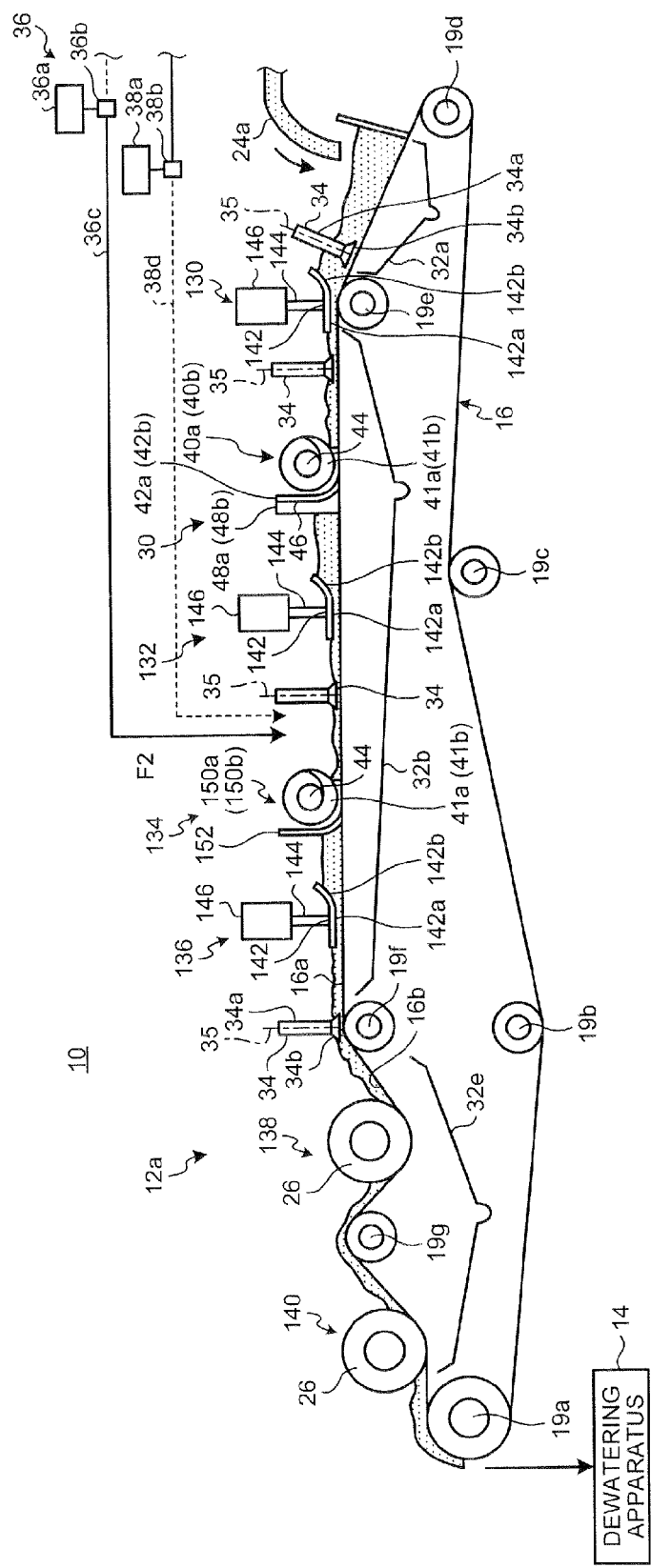
FIG. 26 is a side view illustrating a configuration of a concentration apparatus according to a modified example.
Figure 27:
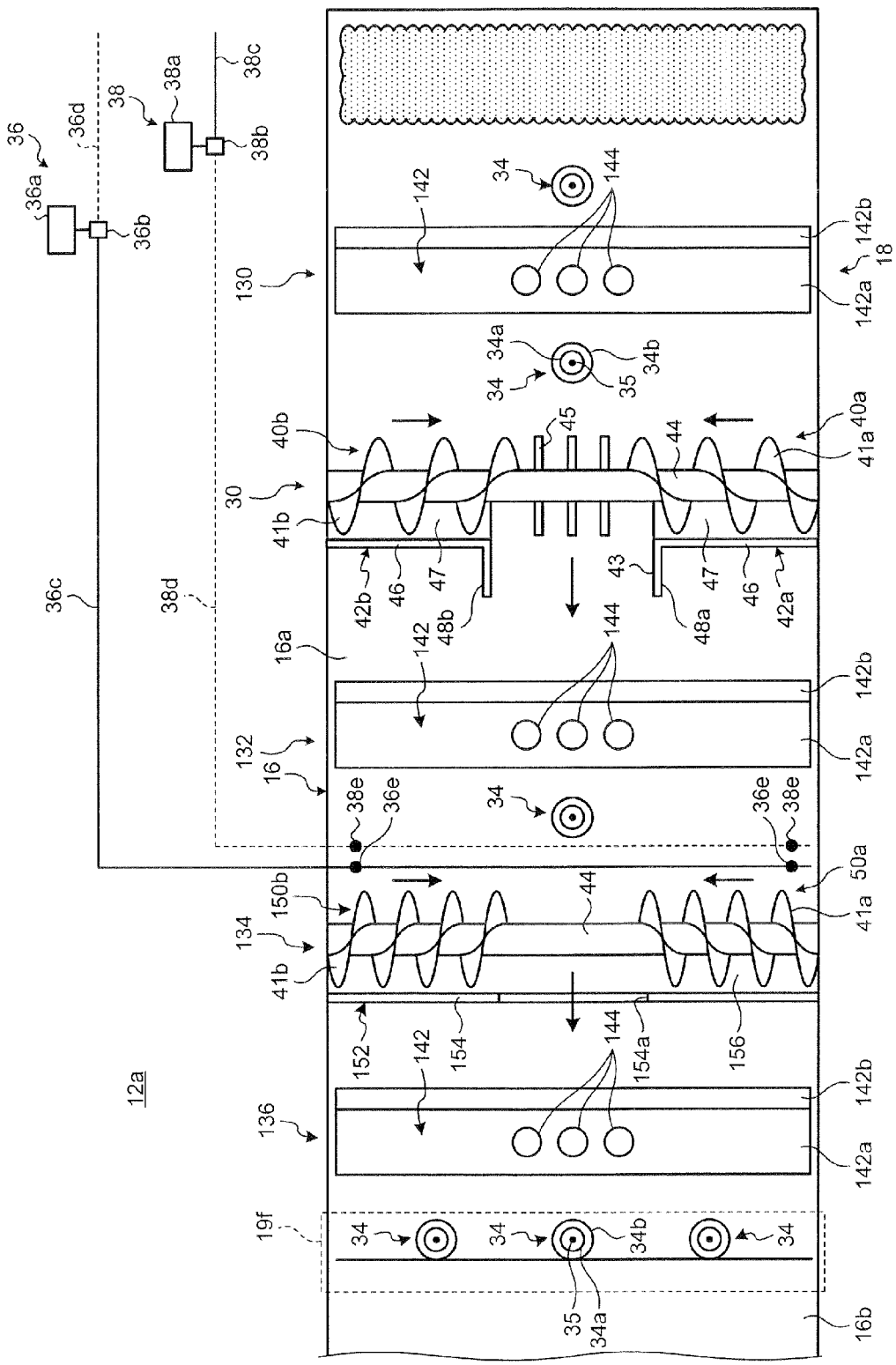
FIG. 27 is a plan view illustrating a concentration apparatus shown in FIG. 26.

FIG. 26 is a side view illustrating a configuration of a concentration apparatus 12a according to a modified example, and FIG. 27 is a plan view of the concentration apparatus 12a shown in FIG. 26.

As shown in FIG. 26 and FIG. 27, configurations upstream of and downstream from the moving mechanism 30 in the concentration apparatus 12a are different from those of the concentration apparatus 12 shown in FIG. 1 and FIG. 2. The concentration apparatus 12a includes a first pressurizing unit 130 upstream of the moving mechanism 30, and includes, downstream from the moving mechanism 30, in order, a second pressurizing unit 132, a second moving mechanism 134, a third pressurizing unit 136, a fourth pressurizing unit 138, and a fifth pressurizing unit 140. The concentration apparatus 12a is additionally provided with rollers 19f and 19g between the rollers 19a and 19e that support the filter cloth belt 16. By the rollers 19f and 19g, the fourth pressurizing unit 138, and the fifth pressurizing unit 140; the filter cloth belt 16 meanders up and down downstream from the roller 19f.

The first pressurizing unit 130 is a lifting type pressurizing device that subjects the sludge introduced into the moving mechanism 30 to pressure dewatering. The first pressurizing unit 130 includes: a piston 142 that moves up and down with respect to the top surface 16a of the filter cloth belt 16; and a drive unit 146 that drives the piston 142 up and down via a rod 144.

The piston 142 includes: a plate 142a, which is opposite to the top surface 16a of the filter cloth belt 16 and squashes the sludge; and an inclined plate 142b, which extends by bending diagonally upwards to an upstream side from an end portion of the plate 142a at an upstream side in the sludge conveyance direction of the filter cloth belt 16 and defines an introduction port for the sludge. The piston 142 is arranged over the whole width of the filter cloth belt 16 (see FIG. 27). By changing settings of a driven state of the rod 144 by the drive unit 146, a bottom dead center position of the piston 142 prescribing a gap between the piston 142 and the filter cloth belt 16 is able to be adjusted.

The second pressurizing unit 132 and the third pressurizing unit 136 may be configured similarly to the first pressurizing unit 130 and each of the second and third pressurizing units 132 and 136 includes a piston 142, a rod 144, and a drive unit 146. A part or all of these first pressurizing unit 130, second pressurizing unit 132, and third pressurizing unit 136 may by configured similarly to the pressurizing unit 28 by using pressurizing rollers.

The second moving mechanism (moving mechanism) 134 consolidates the sludge by reducing the width direction dimension of the sludge simultaneously with increasing the sludge height while moving the sludge conveyed on the filter cloth belt 16 in the cross direction, to sufficiently knead the inorganic flocculant F2 added by the second chemical feeder 36 therein. Thereby, sludge filtration efficiency in the concentration apparatus 12a and dewatering apparatus 14 arranged downstream therefrom is able to be improved and sludge concentration is able to be increased. In contrast to the above described moving mechanism 30, the second moving mechanism 134 includes screws 150a and 150b instead of the screws 40a and 40b, and includes a guide plate 152, instead of the guide plates 42a and 42b.

As shown in FIG. 27, the screws 150a and 150b are formed such that the pitch of the spirals of its screw blades 41a and 41b is smaller than that of the screws 40a and 40b of the moving mechanism 30. Thereby, the moving speed of the sludge by the screws 150a and 150b is made slower than that by the screws 40a and 40b. The pitch of the spirals of the screws 150a and 150b may be the same as that of the screws 40a and 40b.

Figure 28:
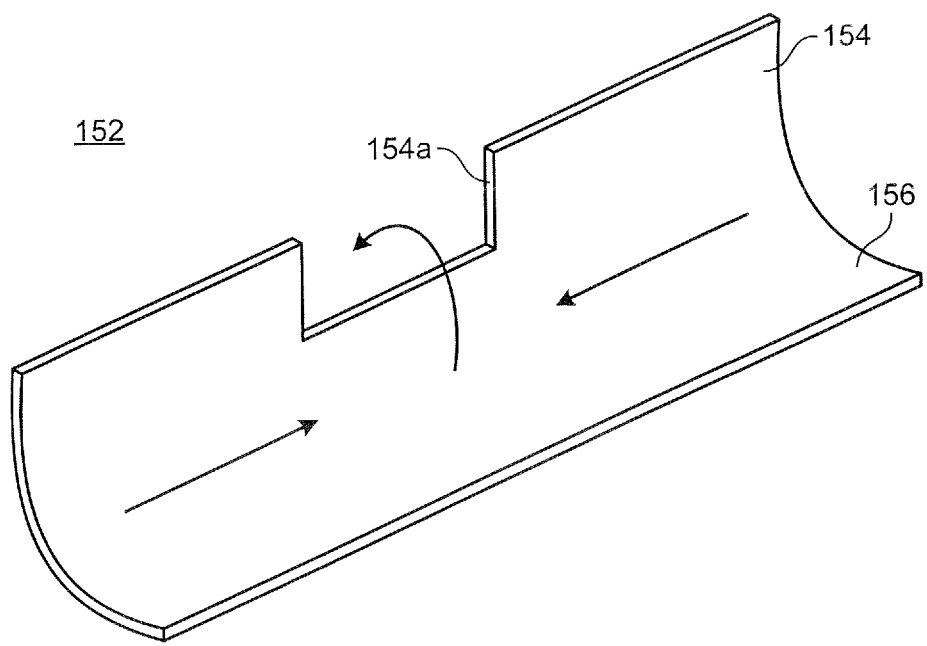
FIG. 28 is a perspective view illustrating a configuration of a guide plate of a second moving mechanism.

FIG. 28 is a perspective view illustrating a configuration of the guide plate 152 of the second moving mechanism 134.

As shown in FIG. 26 to FIG. 28, the guide plate 152 has: a wall portion 154 that stands up at a position downstream from the screws 150a and 150b and close to the screws 150a and 150h; and a bottom portion 156 that covers approximately a lower half of the screws 150a and 150b by a lower end of the wall portion 154 being curved and protruding towards an upstream side in the sludge conveyance direction of the filter cloth belt 16. The wall portion 154 and the bottom portion 156 extend over the whole width of the filter cloth belt 16 correspondingly with the screws 150a and 150b. As shown in FIG. 27 and FIG. 28, at the center of a top portion of the wall portion 154, a rectangular notched portion 154a is formed. The notched portion 154a is a portion corresponding to the sludge passage 43 of the moving mechanism 30, and for example, has a width approximately the same as a gap between the screws 150a and 150b and has a height approximately a half of a height of the wall portion 154.

As shown in FIG. 26 and FIG. 27, in the concentration apparatus 12a, at an upstream side of the first pressurizing unit 130, at an upstream side of the moving mechanism 30, at an upstream side of the second moving mechanism 134, and at a downstream side of the third pressurizing unit 136, pole bodies 34 are stood up. The pole bodies 34 arranged at the downstream side of the third pressurizing unit 136 stand at a position, which is the inlet of an inclined surface 16b of the filter cloth belt 16 formed by the roller 19f.

The pole body 34 of the concentration apparatus 12a is configured similarly to that of the concentration apparatus 12 shown in FIG. 1, and is configured of a pole 34a, which is column shaped, and a flange 34b, which is provided at a lower end portion of the pole 34a and is truncated cone shaped. This pole body 34 is arranged rotatably around an axial bar 35, which is a central line thereof, and movably up and down along the axial bar 35. Although description thereof has been omitted above, the pole body 34 of the concentration apparatus 12 is arranged, similarly to the pole body of the concentration apparatus 12a, to be rotatable and movable up and down by an axial bar not shown.

As shown in FIG. 27, in this configuration example, although three pole bodies 34 are arranged in the width direction of the filter cloth belt 16 at the downstream side of the third pressurizing unit 136, and the pole bodies at the other positions are singly arranged, the numbers thereof to be arranged may be modified. The sludge conveyed on the filter cloth belt 16 comes into contact with the pole bodies 34 and is scattered to left and right by overriding the inclined surfaces of the flanges 34b. At the three pole bodies 34 arranged at the inlet of the inclined surface 16b, the sludge is turned over while rolling over towards the inclined surface 16b just after the sludge overrides the inclined surfaces of the flanges 34b, being increased in its bulk. Since the sludge rolls down the inclined surface 16b in a state where the bulk has been increased, in this process of rolling, the sludge is introduced into the fourth pressurizing unit 138 in a state where the portions of sludge have piled up on top of one another and have been increased further in bulk.

As shown in FIG. 26, the fourth pressurizing unit 138 squashes and levels flatly the sludge that has been increased in bulk by the pole bodies 34 and the inclined surface 16b, to spread the sludge over the width direction the filter cloth belt 16 again. The fourth pressurizing unit 138 is configured similarly to the above described pressurizing unit 28, for example, and includes a primary dewatering roller 26 having an outer peripheral surface that is arranged to be pressure-contacted with the filter cloth belt 16. The fifth pressurizing unit 140 may have a configuration similar to that of the fourth pressurizing unit 138 and includes a primary dewatering roller 26. The moisture that has been removed by the fourth pressurizing unit 138 and the fifth pressurizing unit 140 is collected by a filtrate receiving tray 32e.

In the sludge dewatering system 10 including this concentration apparatus 12a, the sludge, after being added with a predetermined polymer flocculant F1 and stirred and mixed in the flocculation mixing tank 24, is fed onto the top surface 16a of the filter cloth belt 16 from the outlet port 24a and thereafter is introduced into the first pressurizing unit 130 via the pole body 34. The sludge is subjected to pressure dewatering while being squashed by the piston 142 and flattened over the whole width of the filter cloth belt 16 in the first pressurizing unit 130, and thereafter is introduced into the moving mechanism 30 via the pole body 34 to be consolidated.

The sludge consolidated by the moving mechanism 30 is then introduced into the second moving mechanism 134 while a predetermined inorganic flocculant F2 is being dropped from addition nozzles 36e of the second chemical feeder 36, after being subjected to pressure dewatering again in the second pressurizing unit 132 and going past the pole body 34.

In the second moving mechanism 134, by the extrusion force in the width direction by the screws 150a and 150b, the portions of sludge are squashed onto one another at the central portion of the filter cloth belt 16 to be consolidated. When that is done, in the second moving mechanism 134, since the guide plate 152 extends over the whole width of the filter cloth belt 16, an outlet therefor is only the notched portion 154a at the top portion center. Therefore, since the sludge is dammed up over the whole width of the filter cloth belt 16 when the sludge is moved by the screws 150a and 150b, the sludge staying time is extended as compared with that in the moving mechanism 30 upstream thereof, and thus high dewatering effect is achieved and mixing with the inorganic flocculant F2 is promoted. What is more, since in the concentration apparatus 12a, the pitch of the spirals of the screws 150a and 150b is made smaller than that of the screws 40a and 40b of the moving mechanism 30, the sludge staying time is able to be extended even further.

The sludge, which is consolidated in the second moving mechanism 134 and discharged due to overflow from the notched portion 154a in the state of being increased in bulk, reaches the pole body 34 just before the inclined surface 16b of the filter cloth belt 16 after being subjected to pressure dewatering again in the third pressurizing unit 136. The sludge is increased in bulk again while being turned upside down by the pole body 34, and while being increased further in bulk in the process of rolling down the inclined surface 16b just after it, the sludge is introduced into the fourth pressurizing unit 138 and the fifth pressurizing unit 140. The sludge introduced into the fourth pressurizing unit 138 and the fifth pressurizing unit 140 is subjected to pressure dewatering y being held and pressurized between the respective primary dewatering rollers 26 and the filter cloth belt 16 to be discharged and dropped, and is fed into the downstream dewatering apparatus 14 (see FIG. 26).

Therefore, since, in the concentration apparatus 12a, the pole bodies 34 are arranged at a rear end of the filtering unit 18 that concentrates the sludge (just before the inclined surface 16b), the bulk of the sludge is able to be increased while the sludge is continuously conveyed by the filter cloth belt 16. Thereby, the sludge dewatering efficiency is able to be increased by effectively utilizing the whole width of the primary dewatering roller 26 forming the fourth pressurizing unit 138 and the fifth pressurizing unit 140. What is more, since the inclined surface 16b, which is in a downhill direction, is arranged just after these pole bodies 34, the bulk of the sludge is able to be increased further.

Since, in the concentration apparatus 12a, the guide plate 152 is provided over the whole width of the filter cloth belt 16 behind the screws 150a and 150b forming the second moving mechanism 134, the sludge staying time is able to be increased, and high dewatering effect and promotion of the mixing with the inorganic flocculant F2 are able to be achieved. Since the notched portion 154a is provided at the center of the top portion of the wall portion 154, the notched portion 154a serves as a passage for discharging the sludge downstream, and thus excessive staying is avoided and the conveyed state of the sludge is not hindered.

In the concentration apparatus 12a, the sludge is dehydrated while being pressurized and leveled flatly in the first pressurizing unit 130, the second pressurizing unit 132, and the third pressurizing unit 136 provided at respective positions of the filtering unit 18. Thereby, consolidation of the sludge by the pole bodies 34, the moving mechanism 30, and the second moving mechanism 134 and the squashing and dewatering of the consolidated sludge are repeated, and the resulting concentration is able to be increased further.

Moreover, in the first pressurizing unit 130, the second pressurizing unit 132, and the third pressurizing unit 136, the lifting type pressurizing devices using the pistons 142 are used. Therefore, by changing the settings of the top dead centers and bottom dead centers of the pistons 142 as appropriate, fluctuation in the height direction of the sludge is able to be easily dealt with. Further, since in the piston 142, the inclined plate 142b directed upwards is provided on the upstream side of the plate 142a, the sludge is able to be introduced therein smoothly. As described above, a part or all of the first pressurizing unit 130, the second pressurizing unit 132, and the third pressurizing unit 136 may be replaced with a configuration using a pressurizing roller similar to the primary dewatering roller 26 of the pressurizing unit 28, but for a configuration using a pressurizing roller, since the pressurizing roller is considerably a heavy load, adjustment of the gap from the filter cloth belt 16 is difficult. In contrast, in the configuration using the pistons 142, since they are basically of the lifting type, adjustment of gaps from the filter cloth belt 16 is easy and since the piston 142 is lighter than a pressurizing roller, the adjustment of the gaps is easier and the cost therefor is low.

The present invention is not limited to the above described embodiments, and may be freely modified without departing from the spirit of the present invention, of course.

In the above described embodiments, the examples of the configuration, in which the sludge before being fed to the concentration apparatus 12 or 12a is added with the first chemical agent and the sludge conveyed in the concentration apparatus 12 or 12a is added with the second chemical agent, have been presented, but depending on specifications of a sludge dewatering system, characteristics of sludge, and the like, to which the present invention is applied, sufficient effect is able to be achieved even if only one of the first chemical agent and second chemical agent is used or both of these are not used.

According to a configuration described above, in a concentration apparatus, after a second chemical agent is added to sludge that has been concentrated to a certain degree by being added with a first chemical agent and being subjected to gravity filtration in a filtering unit, by moving the sludge in a direction intersecting a conveyance direction of a filter body in a moving mechanism, the sludge is able to be sufficiently kneaded with the second chemical agent upon this movement and is able to be consolidated further. Thereby, concentration and dewatering ratio of the sludge in the concentration apparatus are able to be improved and a resulting concentration thereof is able to be increased. Moreover, by providing, in the concentration apparatus, a chemical feeder that adds the second chemical agent after the addition of the first chemical agent and the concentration, and the moving mechanism that kneads this second chemical agent therein, and providing, downstream therefrom, a dewatering apparatus that subjects the sludge to pressure dewatering, while decreasing amounts of chemicals, such as a polymer flocculant and an inorganic flocculant, with the compact configuration, moisture content in the sludge is able to be widely reduced and the resulting concentration of the sludge is able to be increased further.

According to the present invention, by providing, in a concentration apparatus, a chemical feeder that adds a second chemical agent after addition of a first chemical agent and concentration, and a moving mechanism that kneads this second chemical agent, and providing downstream therefrom a dewatering apparatus that subjects sludge to pressure dewatering, while decreasing amounts of chemicals, such as a polymer flocculant and an inorganic flocculant, with the compact configuration, moisture content of the sludge is able to be widely reduced and a resulting concentration of the sludge is able to be increased further.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sludge dewatering system, comprising:
 a concentration apparatus that concentrates sludge while conveying the sludge on a top surface of a filter body; and
 a dewatering apparatus that subjects the sludge discharged from the concentration apparatus to pressure dewatering,
 wherein the concentration apparatus includes:
  a first chemical feeder that has an addition section provided on an upstream side of a filter cloth belt in a conveyance direction and the first chemical feeder is configured to add a first chemical agent to the sludge from the addition section,
  the filter cloth belt, which is provided as the filter body, is configured to subject the sludge in which the first chemical agent is added to gravity filtration while conveying the sludge on a top surface of the filter cloth belt in the conveyance direction;
  a second chemical feeder in which an addition section is provided above the filter cloth belt, the second chemical feeder is configured to add a second chemical agent to the sludge on the filter cloth belt from the addition section and the second chemical agent is a different flocculant from the first chemical agent; and a movement mechanism that is provided on the filter cloth belt at a downstream side of the second chemical feeder in the conveyance direction and extending in a direction intersecting the conveyance direction of the sludge by the filter body, the movement mechanism comprising a screw that has an outer diameter, which extends axially in the direction intersecting the conveyance direction of the sludge by the filter body, and the sludge is moved by rotation of the screw, and a guide plate for guiding the movement of the sludge by the screw, the guide plate comprising a wall portion and a bottom portion, the wall portion is stood up at a position that is a downstream side of the screw in the conveyance direction of the sludge by the filter body so as to be close to the screw, and the bottom portion comprises an edge that extends in an upstream direction such that the edge is positioned on the downstream side of the screw and is below the lowest point of the outer diameter of the screw, which increases a height of the sludge to consolidate the sludge in which the second chemical agent is added by moving the sludge by the rotation of the screw.

2. The sludge dewatering system according to claim 1, wherein the guide plate has, at a front side in a moving direction of the sludge by the screw, a sludge passage that lets the sludge moved by the screw pass to a downstream side, and the movement mechanism reduces a width direction dimension of the sludge on the filter body while kneading the second chemical agent with the sludge, by moving the sludge having been added with the second chemical agent with the screw and by discharging the sludge to the downstream side from the sludge passage.

3. The sludge dewatering system according to claim 2, wherein the concentration apparatus has a pressurizing unit that is arranged downstream from the movement mechanism, and that performs pressure dewatering of the sludge having been reduced in the width direction dimension by the movement mechanism and sent out from the sludge passage, and simultaneously enlarges the width direction dimension of the sludge, and then discharges the sludge to the dewatering apparatus.

4. The sludge dewatering system according to claim 1, wherein the dewatering apparatus is a belt press type dehydrator that is arranged below the concentration apparatus and subjects the sludge to the pressure dewatering between a pair of top and bottom belts, and a traveling speed of the belts in the dewatering apparatus is set slower than a traveling speed of the filter body in the concentration apparatus.

5. The sludge dewatering system according to claim 1, wherein the second chemical feeder is provided to be able to add the second chemical agent to at least a position biased to one side in a width direction of the sludge conveyed by the filter body, and the screw is arranged, in a direction tilted with respect to the conveyance direction of the sludge by the filter body, such that one side end portion of the screw corresponding to the one side in the width direction of the sludge added with the second chemical feeder is at an upstream side.

6. The sludge dewatering system according to claim 1, wherein the guide plate is inclined in a direction gradually separating from the screw upwards.

7. The sludge dewatering system according to claim 1, wherein the screw has a blade formed with a flange having an outer peripheral edge portion that is bent in a moving direction of the sludge by the screw.

8. The sludge dewatering system according to claim 1, wherein downstream from, in the conveyance direction of the sludge by the filter body, or above a blade of the screw, a rotating plate that is drivenly rotated by the blade of the screw that rotates is provided, the rotating plate guiding the sludge moved by the screw.

9. The sludge dewatering system according to claim 1, wherein above a blade of the screw, a plate is provided, the plate having a plurality of plate pieces arranged in parallel with proximal end portions thereof connected to one another along a shaft direction of the screw, and the plate being configured such that each plate piece is able to be flipped up by the blade of the screw.

10. The sludge dewatering system according to claim 1, wherein upstream of the concentration apparatus, a flocculation mixing tank that mixes the first chemical agent with the sludge is provided, and the second chemical feeder is able to add the second chemical agent to any one or both of the sludge that is upstream of the flocculation mixing tank and the sludge downstream from the flocculation mixing tank.

11. The sludge dewatering system according to claim 1, wherein the second chemical feeder has a plurality of chemical agent adding ports that open above the filter body and are for adding the second chemical agent to the sludge.

12. The sludge dewatering system according to claim 1, wherein the movement mechanism further has two screws that are sequentially arranged downstream, in the conveyance direction of the sludge by the filter body, from the guide plate, and the two screws are set to rotate inversely of each other and arranged to be able to move the sludge simultaneously with the two screws.

13. The sludge dewatering system according to claim 1, wherein the dewatering apparatus is a belt press type dehydrator that is arranged below the concentration apparatus and that subjects the sludge to the pressure dewatering between a pair of top and bottom belts, and at an outlet side of the concentration apparatus, a measuring device that measures moisture content or viscosity of the sludge discharged from the concentration apparatus is provided, and a traveling speed of the belts of the belt press type dehydrator is controlled according to a result of detection by the measuring device.

14. The sludge dewatering system according to claim 1, wherein a sludge leveling mechanism that reduces height of the sludge conveyed on the filter body at a downstream position of the movement mechanism is provided.

15. The sludge dewatering system according to claim 1, wherein the concentration apparatus:

includes a filtrate collecting apparatus that collects a filtrate discharged from the sludge that has been added with the second chemical agent; and is provided with a line that supplies the second chemical agent included in the filtrate collected by the filtrate collecting apparatus to a side where the second chemical agent is fed to the sludge.

16. The sludge dewatering system according to claim 1, wherein the filter body is inclined downwardly to form an inclined surface at a downstream side of the filtering unit, and the concentration apparatus has a pole body arranged to come into contact with the sludge at a position just before the inclined surface.

17. The sludge dewatering system according to claim 1, wherein the guide plate extends over a width direction of the filter body and is provided with a notched portion through which the guided sludge is discharged.

18. The sludge dewatering system according to claim 1, wherein the concentration apparatus has a pressurizing device that squashes, with up and down motion of a piston, the sludge conveyed in the filtering unit.

19. The sludge dewatering system according to claim 1, wherein the second chemical feeder comprises a plurality of nozzles that are respectively provided above an outer peripheral side edge portion of the filter cloth belt, such that each nozzle of the plurality of nozzles is configured to supply the second chemical agent in a continuous band shape along the outer peripheral side edge portion of the filter cloth belt in the conveyance direction, and the plurality of nozzles are positioned upstream to the movement mechanism that extends in the direction intersecting the conveyance direction of the filter cloth.

20. The sludge dewatering system according to claim 1, wherein the movement mechanism further comprises a shaft that extends in the direction intersecting the conveyance direction of the sludge by the filter body, a blade that extends from the shaft in a direction parallel to the conveyance direction of the sludge by the filter body and a flange that is formed by bending an outer peripheral edge portion of the blade so as to extend in the direction intersecting the conveyance direction of the sludge by the filter body, such that the flange formed by the outer peripheral edge portion of the blade extends in a direction parallel to the extending direction of the shaft.

21. The sludge dewatering system according to claim 1, wherein the bottom portion of the guide plate is formed by bending a lower end of the wall portion so as to protrude under the screw, wherein the bottom portion of the guide plate protrudes towards an upstream side of the screw that has a center, such that an upper surface of the bottom portion of the guide plate is positioned under the screw, and wherein the bottom portion of the guide plate is bent so as to extend in a direction perpendicular to a height of the wall portion, with the bottom portion of the guide plate protruding towards an upstream side of the screw such that the bottom of the guide plate has an upstream edge that is positioned below a lowermost point of the outer diameter of the screw.

* * * * *